US012793006B1

(12) United States Patent
Hang

(10) Patent No.: US 12,793,006 B1
(45) Date of Patent: Nov. 10, 2026

(54) GARAGE DETECTION FOR SECURE DELIVERY OF PACKAGES

(71) Applicant: Amazon Technologies, Inc., Seattle, WA (US)

(72) Inventor: Carlson Vichhai Hang, Eagan, MN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/538,510

(22) Filed: Dec. 13, 2023

(51) Int. Cl.
*G06Q 10/083* (2024.01)
*G06V 10/82* (2022.01)
*G06V 20/10* (2022.01)

(52) U.S. Cl.
CPC ....... *G06Q 10/08355* (2013.01); *G06V 10/82* (2022.01); *G06V 20/176* (2022.01)

(58) Field of Classification Search
CPC .. G06Q 10/083; G06Q 50/16; G06Q 30/0601; G06Q 10/0836; G06Q 10/0832; G06Q 10/0833; G06Q 10/08; G06Q 10/0834; G06Q 10/0835; G06Q 10/0838; B64U 2101/64; G01C 21/3484; G01C 21/343; G01C 21/3446; G01C 21/3617; G01C 21/3492
See application file for complete search history.

(56) References Cited

U.S. PATENT DOCUMENTS

| | | | | |
|---|---|---|---|---|
| 9,743,239 | B1 * | 8/2017 | Mishra | H04W 4/023 |
| 2020/0286271 | A1 * | 9/2020 | Adams | G06T 7/13 |
| 2021/0004589 | A1 * | 1/2021 | Turkelson | G06V 30/19173 |
| 2021/0174301 | A1 * | 6/2021 | Abeywardena | G05D 1/0022 |
| 2023/0393591 | A1 * | 12/2023 | Gordon | G06V 10/82 |
| 2024/0168493 | A1 * | 5/2024 | Shoeb | B64D 47/08 |
| 2024/0395015 | A1 * | 11/2024 | Mullappilly | G06V 20/13 |

OTHER PUBLICATIONS

M. Suganthi and C. Akila, "Convolution Neural Network Approach for Satellite Object Detection and Recognition," 2023 International Conference on Network, Multimedia and Information Technology (NMITCON), Bengaluru, India, 2023, pp. 1-6, doi: 10.1109/NMITCON58196.2023.10276192 (Year: 2023).*

* cited by examiner

*Primary Examiner* — Michael P Harrington
(74) *Attorney, Agent, or Firm* — Eversheds Sutherland (US) LLP

(57) ABSTRACT

Systems and methods determine an address associated with a delivery of a package to an address, determine, based at least in part on the address, first image data associated with the address, determine a boundary associated with the address, generate, based at least in part on the address and the first image data, second image data, provide, as an input to a trained machine learning model, the second image data, generate, as an output from the trained machine learning model, a score associated with the address, where the score represents a probability that the address includes a detached garage, and determine, based at least in part on the score, a delivery route for delivering the package to the detached garage.

19 Claims, 10 Drawing Sheets

GARAGE DETECTION FOR SECURE DELIVERY OF PACKAGES

BACKGROUND

The rise of e-commerce has brought about an increase in order fulfillment, packaging, and shipment. As a result, more packages are being shipped and delivered to consumers. A common delivery method involves a courier placing a package on a front porch of a home. This delivery method, however, leaves the package susceptible to theft and/or damage from weather. In some examples, and to alleviate these occurrences, the courier may require a consumer to travel to a facility to pick up the package in person and/or obtain a signature to confirm delivery. However, these approaches are often inconvenient and/or lead to poor user experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
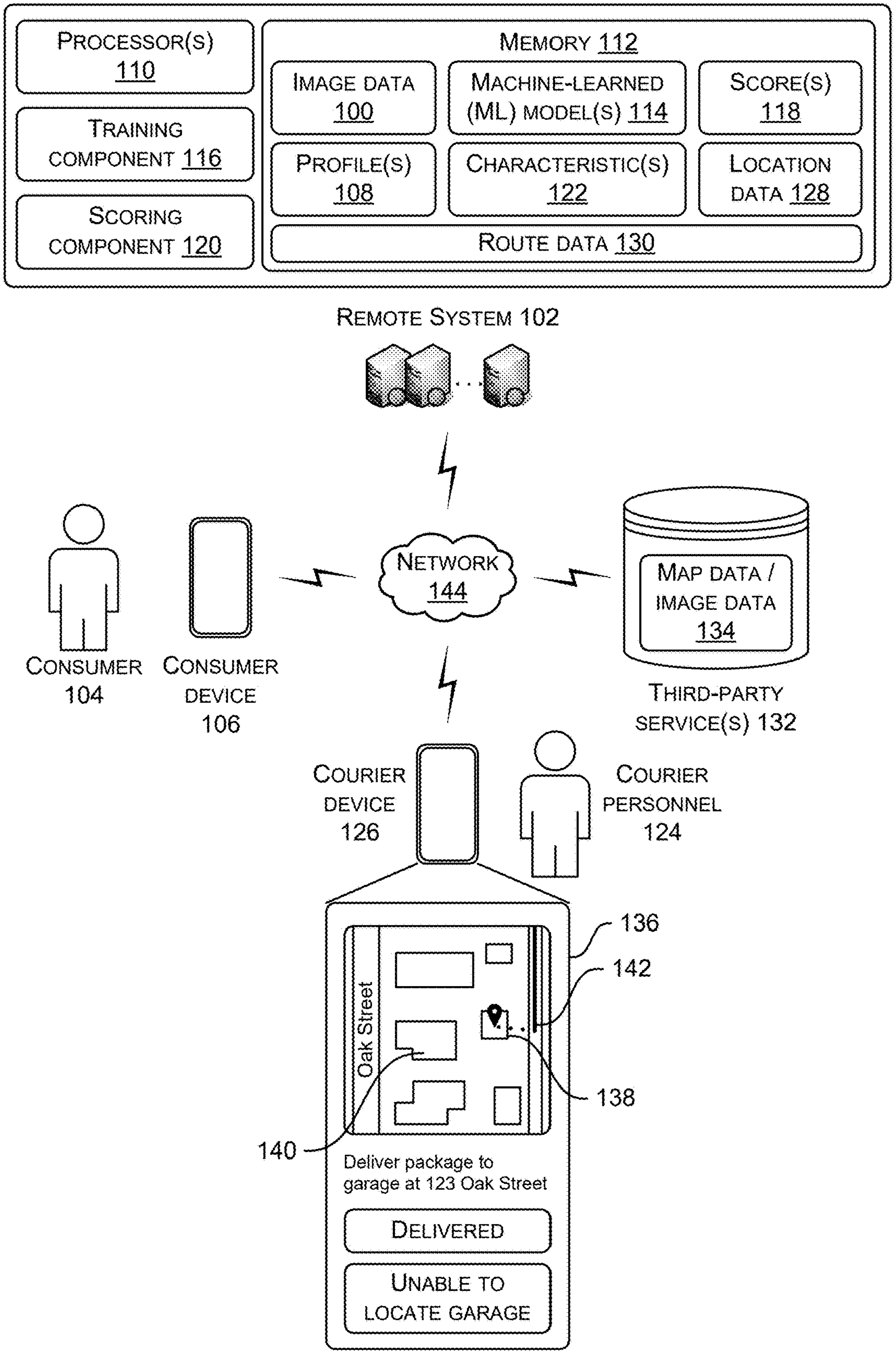
FIG. 1 illustrates an example environment for identifying a location associated with a detached garage for delivering packages to an address, according to examples of the present disclosure.

This application is directed, at least in part, to systems and methods that detect detached structures, such as a detached garage, within image(s) for identifying locations to deliver packages. For example, packages are conventionally delivered to a front porch or doorstep of a house, which leaves the package susceptible to theft. In some instances, a homeowner may provide a courier with a garage access code for accessing a garage of the house. The courier may then safely leave the package within the garage. However, in some instances, the garage may not be accessible from a front of the house, but instead, may be located behind the house and/or accessible via a separate alleyway or service road. In such instances, the garage may be difficult to find and/or inaccessible to the courier. Accordingly, by detecting detached structures within the image(s) and properly routing the courier, the packages may be safety delivered.

In some instances, image recognition models, such as machine learning (ML) model(s) (e.g., convolutional neural network, visual transformer, etc.) may be trained to identify patterns between houses and detached garages. For example, satellite image(s)/imagery of a property (e.g., parcel, block, land, etc.) may be input to the ML model(s) and the ML model(s) may output identified structures on the property. The ML model(s) may be configured to process the image(s) and identify structures such as a house (e.g., dwelling, residence, building, etc.) as well as structures that are external or detached from the house (e.g., garage, shed, barn, etc.). In some instances, bounding boxes may be placed around the structures on the property, and from the bounding boxes, a house and/or a detached garage may be identified. For example, a first bounding box may be placed around a house identified from the image(s), and a second bounding box may be placed around a garage identified from the image(s). Here, the first bounding box may be labeled as "House" and second bounding box may be labeled as "Garage." Of course, other labels and/or bounding boxes may be used.

In some instances, the structures may be identified based at least in part on knowing property lines associated with the property, roadways adjacent to the property, driveways on the property, vehicles adjacent to or on the property, and so forth. For example, the ML model(s) may be trained to identify other objects, such as roadways, driveways, vehicles, etc. Similar to the house and the detached garage, bounding boxes may be placed around these objects as well and associated with a label. Using these identified objects, a location of a detached garage on the property and/or how to access the detached garage may be deduced. For example, identifying a vehicle on the property may be used to determine where the vehicle(s) are parked, and consequently, a location of the detached garage. As another example, an identification of a driveway may be used to determine a location of the detached garage.

In some instances, the ML model(s) may be configured to determine characteristic(s) of the property based at least in part on the image(s). For example, the ML model(s) may determine characteristic(s) such as a number of structures, a location of structures, an orientation of structures, a size of the structures, a location of walkways adjacent to and/or on the property, a location of roadways adjacent to and/or on the property, a location of alleyways/service road(s) adjacent to and/or on the property, a location of vehicles adjacent to and/or on the property, a location and/or presence of fences or other barriers, and so forth. These characteristic(s) may be used to identify a house and/or detached garage on the property, as well as how to access the detached garage (e.g., via certain roadways, etc.). In some instances, the characteristic(s) may be compared against reference characteristic(s), such as a size of a detached garage, in order to properly identify and locate the detached garage.

The ML model(s) may initially be trained, via supervised and/or non-supervised learning, on image(s) that contain a house and a detached garage, as well as images that contain a house and no detached garage. A trained database may indicate those properties that have a detached garage and characteristic(s) associated therewith, such as a size of the detached garage, a distance from the house, a location relative to the house, roof lines and/or pitches of the detached garage, etc. In other words, the ML model(s), having been trained, may use those identified characteristic(s) for processing new image(s) of properties to determine whether the properties include a detached garage. As such, once trained, the ML model(s) may receive image(s) of a property and output an indication of whether a detached garage was identified.

In some instances, the ML model(s) output a score (e.g., confidence, value, etc.) associated with a confidence that the detached garage was detected. A score may also be associated with a confidence of detecting a house at the property. When the ML model(s) output the score associated with identifying the detached garage, the score may be compared against a threshold. When the score is greater than the threshold, a high confidence exists that the detached garage was identified, and subsequently, the detached garage may be used as the delivery location for the package and the courier may be routed accordingly. In some instances, coordinates of the detached garage may be determined via the ML model(s), and/or determining a location of the detached garage (e.g., from the bounding box), and the courier may be routed to the coordinates via adjacent streets, alleyways, etc. for delivering the package. For example, displays may be presented to the courier on a courier device (e.g., tablet, mobile device, etc.) for delivering the package to the detached garage.

Alternatively, when the score output by the ML model(s) is less than the threshold, a low confidence exists that the detached garage was identified. Here, the property may not include a detached garage and/or the detached garage may have been unidentifiable. In these instances, the package may not be delivered to the detached garage, but instead, a front of the house, the consumer may be asked to confirm the location of the detached garage (if any), and/or the consumer may be asked to identify the location of the detached garage. For example, the image(s) of the property may be provided to the consumer and prompt(s) may ask the consumer to identify the detached garage on the property. In another scenario, the image(s) may be provided to the consumer and prompts may be provided that ask the consumer to confirm an identified detached garage. Here, a detached garage may have been identified by the ML model(s), but because the score was less than the threshold, the consumer may be asked to confirm the location of the identified detached garage. In other instances, if the score was less than the threshold, the courier personnel may be instructed to locate the detached garage themselves upon arriving at the property. The confirmation of the location of the detached garage may be used to further train the ML model(s).

In some instances, and as noted above, the image(s) may represent satellite or aerial image(s) of the property (e.g., satellite imagery). In some instances, the image(s) may be obtained via a subscription to a database, or via a having access to a service within the satellite or aerial image(s). The image(s) may be stored in association with certain coordinates that represent longitude and latitude coordinates. Moreover, oftentimes, the satellite or aerial image(s) are associated with or discretized into tiles. Each of the tiles may include coordinates, which represent boundaries, in coordinate space, of the tile. Knowing an address of a delivery allows that address to be searched within a database. Conventionally, a marker (e.g., pin, flag, etc.) resides within the tile and pinpoints the location of the house. The marker is oftentimes located on the house and includes coordinates.

Once the location of the address is known, a tile associated with that address is obtained. The tile is also associated with image data, where the tile is an image of at least a portion of the property. In other words, a tile associated with the address, and more specifically, the coordinate of the maker, is obtained. Oftentimes, the marker is associated with or placed on the house on the property. However, the tile that includes the house may or may not include a complete view of the property. For example, the address might not be centered on the tile and/or a property may be represented within multiple tiles. Therefore, attempting to identify the detached garage from this single tile may result in failing to detect the detached garage. Instead, to avoid these situations, adjacent tiles may be stitched together. For example, using the tile that includes the house (or marker), tiles adjacent to that tile may be obtained and stitched together. This may result in image data in (or an image) that is generated from 9 tiles (e.g., 3 tiles×3 tiles). However, more or less tiles may be stitched together depending upon a fidelity of the tiles in the database.

Once the image data is obtained, the image data may be cropped to the property lines (e.g., boundary) of the property. For example, the property lines (or boundaries) of the property may be obtained via a subscription to a database, or via a service having access to the property lines. In some instances, the database storing or having access to the satellite or aerial image(s) may also have access to the property lines. As each of the tiles are associated with coordinates (e.g., top-left corner, top-right corner, bottom-left corner, bottom-right corner), knowing the coordinates of the property lines allows the image data to be cropped to the property. That is, the coordinates of the tiles are compared against the coordinates of the property lines to crop the property from the tiles. The image data that is input into the ML model(s) may be cropped to include the property. Cropping the image data may avoid the ML model(s) identifying neighboring detached garages (e.g., a detached garage of a neighbor).

However, in some instances, the image data may be cropped to include adjacent property (whether partial or complete). This may assist in identifying roadways, alleyways, vehicles, etc. that are not within the property lines of the property. Introduced above, these objects may be useful in identifying the detached garage and/or a route for the courier to take when traveling to the detached garage. In some instances, the property lines may be indicated within the image data input into the ML model(s), thereby allowing the ML model(s) to search within the property lines for the house and the detached garage. However, the ML model(s) may be trained to determine contextual clues, outside of the property lines, such as roadways, service road, alleyway, etc. for locating the detached garage and/or how to travel to the detached garage.

As an alternative example to obtain the image data, knowing the property lines and the associated coordinates with the property lines may allow for a determination of which tiles include or correspond to the property. These tiles may be obtained (e.g., fetched), for example, by knowing those tiles that include a portion of the property. In other words, those tile(s) (or image(s)) that include the coordinates associated with the property lines may be obtained (e.g., through a comparison of the coordinates of the property with a comparison of the coordinates of the individual tiles). Using the known coordinates of the property lines, and the coordinates of the associated with the tiles, image data of the property may be obtained and cropped from the one or more tiles. As noted above, cropping the image data to include the property avoids the ML model(s) detecting detached garages of adjacent property.

In instances in which the detached garage is identified, and when the score output by the ML model(s) is greater than the threshold, coordinates of the detached garage may be obtained. Such coordinates may be used as the delivery location when instructing a courier personnel. For example, coordinates of the detached garage may be used when generating a route for the courier personnel. For example, the courier may utilize the courier device for traveling between locations, addresses, etc. for delivering the packages along the route. The route may include the location of the detached garage in instances when the consumer has selected for the package to be delivered to the garage. Upon arriving at the detached garage, a garage access code may be displayed to the courier (e.g., via the courier device) to allow the courier personnel to deliver the package to/within the detached garage. In other instances, the courier device of the courier personnel may be permitted to control (e.g., open/close) a garage door via input (e.g., touchscreen) from the courier. During delivery, a location of the courier device, a location of the courier vehicle (e.g., truck), a location of the courier personnel (e.g., personal device), and/or other equipment (e.g., scanner) may be recorded. Such information may be used to deduce where the package was delivered, and/or the route taken by the courier to deliver the package.

For example, in some instances, the detached garage may have been identified by the ML model(s), but upon arriving at the address, the courier personnel may identify a correct location of the detached garage (or a garage). Here, the courier personnel may utilize their personal knowledge of the property upon arriving at the address to determine the correct location of the detached garage. By recording the location of the courier device, the courier vehicle, and so forth, such information may be used to further train the ML model(s). For example, knowing a location that the package was scanned for delivery, a route of the courier personnel taken on the property, a route of the courier vehicle taken to arrive at the property, and so forth, may be used to retrain the ML model(s) to more accurately identify detached garages during future deliveries. Moreover, the correct location of the detached garage may be used for future deliveries to that particular address. Still, in other instances, the courier personnel may be asked to confirm the location of the garage before, during, or after delivery, and such indications may be used train the ML model(s).

In some instances, and as briefly introduced above, the consumer may be asked to confirm the location of the detached garage. For example, after the detached garage is identified via the ML model(s), a user interface may display an image of the property that includes a location associated with the detached garage (as determined via the ML model(s)). Using the user interface (or indications displayed thereon), the consumer may confirm, deny, or edit the location of the detached garage. In some instances, a confirmation of the consumer may be obtained before delivering to the location of the detached garage.

In some instances, editing the location of the detached garage may be accomplished via the consumer manipulating a pin on the image. The consumer may then be permitted to set the location of the detached garage, and such location may be used as a delivery location. As indicated above, the confirmation, denial, or editing of the location of the detached garage may also be used to retrain the ML model(s) to more accurately identify detached garages in future instances. In some instances, the assistance of the consumer to locate the detached garage may be enlisted in instances in which the consumer requests a delivery to the detached garage, but the ML model(s) and/or the courier personnel are unable to locate the detached garage.

Although the discussion herein relates to using ML model(s) to identify detached garages, other structures may be identified for purposes of determining a delivery location for packages. For example, sheds, shops, carports, etc. may be identified. In other instances, displaying an image of the property of the consumer may allow the consumer to locate a desired delivery location (e.g., back porch, within a locker, etc.). Moreover, not all properties may have a detached structure, such as a detached garage, and in such instances, the package may be delivered to the front of the house.

In some instances, consumers may sign up, opt-in, or register for having their packages delivered to their garage. The preferences of the consumers, for example, may be stored in profiles (e.g., accounts) that are accessible. The profiles may indicate previous orders of the consumers, an address of the consumers, access information (e.g., for accessing the garage), data for traveling to the address (e.g., route), and so forth. The systems and methods as described herein may deduce that the consumer has a garage located on their property based on registering for their packages to be delivered to their garage. From this, the image(s) of the property may be obtained for inputting into the ML model(s) in order to identify the location of the detached garage. Stated alternatively, if a consumer does not request that their package be delivered to their garage, then the image(s) of the property may not be obtained and provided to the ML model(s). In such instances, the systems and methods may conclude that the consumer does not have a garage and/or that the consumer does not prefer to have the package delivered to their garage. Still, in other instances, when the consumer opts-in for delivery to the garage, at that time, the consumer may be prompted to identify the location of the detached garage on an image.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment for processing image data 100 to determine a presence, or lack thereof, of a detached garage on a property for use in delivering packages, according to an example of the present disclosure. In some instances, the environment includes a remote system 102 that is tasked and charged with processing the image data 100 to determine the presence of detached garages.

Initially, a consumer 104 may place an order for one or more item(s), such as a books, electronics, household goods, clothing, etc. In some instances, the consumer 104 may interact with a consumer device 106 (e.g., phone, computer, tablet, etc.) for placing the order. As the consumer 104 places the order, information associated with the order (e.g., the item(s)) and/or the consumer 104 is obtained. For example, an address of the consumer 104 may be determined. Information associated with the consumer 104 may be stored in one or more profile(s) 108 (e.g., accounts), where the profile(s) 108 include identifier(s) of the consumer 104, their address, previous orders/purchase histories, and so forth. The profile(s) 108 may also indicate a delivery method of the consumer 104, or how the consumer 104 prefers to have their order(s) delivered to their property, address, etc. For example, in an effort to avoid theft, the consumer 104 may request that their order(s), or packages associated therewith, be delivered to a garage on their property. In some instances, the consumer 104 may sign up, opt-in, or register for having their packages delivered to their garage. The preferences of the consumer 104, for example, may be stored in the profile(s) 108 that are accessible to the remote system 102. The profile(s) 108 may indicate information for accessing the garage, such as a garage code.

In some instances, the remote system 102 may represent a retailer in which the consumer 104 places their order. Alternatively, the remote system 102 may represent a third-party vendor that fulfills the order and/or that is tasked with fulfilling the order. The remote system 102 may also represent a third party that is tasked with the identifying the detached garage within the image data 100. For example, a retailer may enlist the assistance of the remote system 102 for identifying the detached garage.

As shown, the remote system 102 may include processor(s) 110 and memory 112, where the processor(s) 110 may perform various functions and operations associated with identifying detached garages from the image data 100, and the memory 112 may store instructions executable by the processor(s) 110 to perform the operations described herein. In some instances, the remote system 102 may include machine learning (ML) model(s) 114 (e.g., image recognition model(s)) stored in the memory 112, and which receive the image data 100 as an input for determining the presence of the detached garage. The ML model(s) 114 may have been previously trained for a database, dataset, etc. to identify patterns between properties that have houses with detached garages, and those properties that have houses without a detached garage. For example, a training component 116 of the remote system 102 may have previously trained the ML model(s) 114.

The ML model(s) 114 may be configured to process the image data 100 and identify structures such as the house (e.g., dwelling, residence, building, etc.) as well as structures that are external or detached from the house (e.g., garage, shed, barn, etc.). In some instances, the ML model(s) 114 may place bounding boxes around the structures on the property, and from the bounding boxes, the house and/or the detached garage may be identified. As an example, a first bounding box may be placed around a house identified from the image data 100, and a second bounding box may be placed around a detached garage identified from the image data 100. The ML model(s) 114 may also apply labels to objects within the image data 100. For example, the first bounding box may be labeled as "House" and second bounding box may be labeled as "Garage."

In some instances, the structures on the property may be identified based at least in part on knowing property lines associated with the property, roadways adjacent to the property, driveways on the property, vehicles adjacent to or on the property, and so forth. For example, the ML model(s) 114 may be trained to identify other objects as well, such as roadways, driveways, vehicles, etc. adjacent to and/or on the property. Similar to the house and the detached garage, bounding boxes may be placed around these objects as well. Using these identified objects, the ML model(s) 114 may determine a location of a detached garage on the property and/or how to access the detached garage. For example, identifying a vehicle on the property may be used to determine where the vehicles are parked on the property, and consequently, a location of the detached garage. As another example, an identification of a driveway may be used to determine a location of the detached garage.

In some instances, as part of processing the image data 100, the ML model(s) 114 may output a score 118 (e.g., confidence, value, level, etc.) associated with a confidence that the detached garage was detected. In some instances, the score 118 may also be associated with a confidence that a house was detected. In such instances, the ML model(s) 114 may output a first score associated with the property including a house, and a second score associated with the property including a detached garage. In some instances, individual scores 118 may be determined by accessing data associated with the property, such as the image data 100, providing the data as input to the ML model(s) 114, and generating, as output from the ML model(s) 114, the score 118 that is associated with the property including a detached garage, house, vehicle, walkway, etc., In other instances, the ML model(s) 114 may determine the bounding boxes, characteristic(s) of the property, etc., and a scoring component 120 may determine the score 118 based on an output of the ML model(s) 114.

The score 118 may relate to a probability or likelihood that the property includes a detached garage or does not include a detached garage, whether the property includes a house, or does not include a house, and so forth. In other words, the scores 118 determined by the scoring component 120 (e.g., output by the ML model(s) 114) may be machine learning scores. Machine learning generally involves processing a set of examples (called "training data") in order to train the ML model(s). The ML model(s) 114, once trained, can receive new data as input and generate a result as output (which may be characterized as an estimate or prediction). For example, a trained ML model may comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model may be trained to infer a probability, or a set of probabilities, for a classification task based on unknown data received as input.

In the context of the present disclosure, the unknown input may be the image data 100 that is associated with a particular piece of property, address, parcel, etc., and the ML model(s) 114 may be tasked with outputting the score 118 that indicates, or otherwise relates to, a probability of the property including a detached garage, or not including the detached garage. The score 118 that is output by the ML model(s) 114 may relate to either of these probabilities in order to guide the delivery processes. If the score 118 that is output by the ML model(s) 114 relates to a likelihood that the property includes the detached garage, this may be used to determine a delivery location of the package.

The training data that is used to train ML model(s) 114 may include various types of data. In general, training data for image-based machine learning frequently includes images and label data for the images. However, in some instances, training data used to train the ML model(s) 114 may be unlabeled. Accordingly, the ML model(s) 114 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. The following is a list of example features that can be included in the training data for training the ML model(s) 114 described herein. However, it is to be appreciated that the following list of features is non-exhaustive, and features used in training may include additional features not described herein, and, in some cases, some, but not all, of the features listed herein. Example features included in the training data may include, without limitation, a size of the property, a shape of the property, a size of the structures within the property, a shape of the structures, a distance between structures on the property, a size and/or a location of walkways, roadways, alleyways, driveways, etc. adjacent to on or the property, a distance between the structures and the walkways, roadways, alleyways, driveways, etc. adjacent to on or the property, a location of vehicles adjacent to or on the property, a location of fences or other barriers on the property, a location of a lawn on the property, and so forth. In some instances, the features included within the training data may be associated with properties that include a detached garage and/or properties that do not include a detached garage.

In some instances, as part of the training process, weights may be applied to a set of features included in the training data, as derived from the historical data. In some instances, the weights that are set during the training process may apply to parameters that are internal to the ML model(s) 114 (e.g., weights for neurons in a hidden-layer of a neural network). These internal parameters of the ML model(s) 114 may or may not map one-to-one with individual input features of the set of features. The weights may indicate the influence that any given feature, parameter, or characteristic has on the score 118 that is output by the scoring component 120 using the ML model(s) 114.

The ML model(s) 114 may represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The ML model(s) 114 may learn to identify complex relationships between characteristic(s) of properties that have a detached garage and those properties that do not include a detached garage. For example, the ML model(s) 114 may learn to associate certain characteristics of the property with one another to indicate whether the property includes a detached garage. The ML model(s) 114 herein allow for generating the scores 118 that more accurately predict whether the property includes the detached garage, leading to successful package deliveries, increased consumer experiences, reduced theft, and so forth. In some instances, the ML model(s) 114 may learn to predict which properties include a detached garage, and which properties are unlikely to include a detached garage by attributing corresponding scores 118 to the individual properties. In this manner, properties with low scores (e.g., below threshold) may not include a detached garage, while properties with high scores (e.g., above threshold) may include a detached garage. Although the use of a threshold is described as one example way of providing labeling, other techniques are contemplated, such as clustering algorithms, or other statistical approaches that use the trust scores.

The ML model(s) 114 is/are retrainable with new data in order to adapt the ML model(s) 114 to understand properties that have detached garages, as the characteristic(s) of the properties change, or as new correlations become available. In some instances, the ML model(s) 114 may be retrained using image data 100 from properties that include a detached garage as well as properties that do not include a detached garage. That is, the ML model(s) 114 may be trained from characteristic(s) of properties that include a detached garage and/or properties that do not include a detached garage.

As shown, the memory 112 may further store or have access to characteristic(s) 122. These characteristic(s) 122 may, in some instances, be determined via the ML model(s) 114 and represent characteristics of the properties. For example, upon analyzing the image data 100 (e.g., via the ML model(s) 114), the characteristic(s) 122 of the property (or the structures thereon) may be determined. By way of example, these characteristic(s) 122 may be used for determining whether the property includes a detached garage, or whether the property does not include the detached garage. Thus, after analyzing the image data 100, the characteristic(s) 122 may be determined, which in turn, may be used for determining a detached garage was located. In some instances, certain characteristic(s) 122 may be indicative of whether the property includes or does not include the detached garage. In some instances, after analyzing the image data 100 to determine the characteristic(s) 122, the characteristic(s) 122 may be compared to reference characteristics for determining whether the property includes a detached garage. These characteristic(s) 122 may also be used to train and/or retain the ML model(s) 114.

As introduced above, the score 118 may be compared against a threshold, and when the score 118 is greater than the threshold, a high confidence exists that the detached garage was identified from the image data 100. Subsequently, the detached garage may be used as a delivery location for a package and a courier personnel 124 may be routed accordingly. Alternatively, when the score 118 is less than the threshold, a low confidence exists that the detached garage was identified from the image data. Here, the property may not include a detached garage and/or the detached garage may have been unidentifiable from the image data 100. In these instances, the package may not be delivered to the detached garage, but instead, a front of the house or other location.

In some instances, as part of identifying the detached garage, coordinates of the detached garage may be determined via the ML model(s) 114, (e.g., from the bounding box). Subsequently, these coordinates may be used by the courier personnel 124 for delivering the package. For example, the courier personnel 124 may utilize a courier device 126 having one or more display(s) that displays information associated with delivering the package to the detached garage. More particularly, the coordinates of the detached garage may be determined and stored as location data 128 (e.g., geocoordinates, latitude, longitude, etc.). Knowing the location of the detached garage, the remote system 102 may determine a route for delivering the package to the detached garage. In some instances, the route may represent a route or path the courier personnel 124 is to travel along within an environment. The route may, in some instances, correspond to or be associated with how the courier personnel 124 is to travel between address for delivering packages. The courier personnel 124 is instructed to travel along the route(s), and as the courier personnel 124 travels along the route, the courier personnel 124 is instructed to deliver the packages. In some instances, the route may be predetermined routes based on information known about the packages being delivered. Route data 130 may be generated and transmitted to the courier device 126 for displaying a route that includes a delivering to the detached garage of the consumer 104. The route data 130 may be generated based at least in part on the coordinates of the detached garage, as well as knowing or having access to streets, alleyways, service roads, etc. around the property.

In some instances, the image data 100 may represent satellite or aerial image(s) of the property of the consumer 104 (e.g., satellite imagery). In some instances, the image data 100 may be obtained via a subscription to third-party service(s) 132, which has access to map data/image data 134. The map data/image data 134 may be stored in association with certain coordinates that represent longitude and latitude coordinates of addresses, properties, parcels, etc. Although the map data/image data 134 is shown as being separate from the remote system 102, in some instances, the remote system 102 may store or have access to the map data/image data 134 (e.g., on the memory 112).

In some instances, the map data/image data 134 may be associated with, or stored in association with, tiles. Each of the tiles may include coordinates, which represent boundaries, in coordinate space, of the tile on the map data/image data 134. Knowing an address of a delivery allows that address to be searched within a database of the third-party service(s) 132. A tile associated with the address may be obtained, where the tile may represent a high fidelity image of at least a portion of the property. Moreover, conventionally, a marker (e.g., pin, flag, etc.) resides within the tile and pinpoints the location of the house. The marker is oftentimes located on the house and includes coordinates. Once the location of the address is known, a tile associated with the property is obtained.

The tile is also associated with certain map data/image data 134, where the tile is an image of the property (or a portion thereof). In other words, a tile associated with the address, and more specifically, the coordinate of the maker, is obtained. However, oftentimes, the marker is associated with or placed on the house on the property. The location of the marker may assist the ML model(s) 114 identifying the house. For example, as the marker may be placed on the house, the ML model(s) 114 may identify the house within the image data 100 based at least in part on the location of the marker.

Additionally, the tile that includes the house may or may not include a complete view of the property. For example, the property might not be centered on the tile and/or the property may be represented within multiple tiles. Attempting to identify the detached garage from a single tile may result in failing to detect the detached garage. Instead, using the tile that includes the house (or marker), as well as tiles adjacent to that tile, may be obtained and stitched together. This may result in image data 100 (or an image) that is generated from 9 tiles (e.g., 3 tiles×3 tiles). However, more or less tiles may be stitched together depending upon a fidelity of the tiles in the database.

Once the remote system 102 obtains the image data 100, in some instances, the image data 100 may be cropped to the property lines (e.g., boundary) of the property. The property lines may be stored as location data 128, or obtained from the third-party service(s) 132, where the boundaries of the property may be expressed as coordinates. In some instances, the property lines (or boundaries) of the property may be obtained via a subscription to a database, the third-party service(s) 132, whether the same or different third-party service storing or having access to the map data/image data 134. As each of the tiles of the map data/image data 134 are associated with certain coordinates (e.g., top-left corner, top-right corner, bottom-left corner, bottom-right corner), knowing the coordinates of the property lines allows the image data 100 to be cropped to the property. That is, the coordinates of the tiles are compared against the coordinates of the property lines to crop the property from the tiles. The image data 100 that is input into the ML model(s) 114 may be cropped to include the property. Cropping the image data 100 may avoid the ML model(s) 114 identifying neighboring detached garages (e.g., a detached garage of a neighbor).

However, in some instances, the image data 100 may be cropped to include adjacent property (whether partial or complete). This may assist, or more accurately permit the ML model(s) 114 to identify roadways, alleyways, vehicles, etc. that are not within the property lines of the property, but which help in identifying the detached garage and/or a route for the courier personnel 124 to take when traveling to the property. In some instances, the property lines may be indicated within the image data 100 input into the ML model(s) 114, thereby allowing the ML model(s) 114 to search within the property lines for the house and the detached garage. In other instances, the ML model(s) 114 may determine the property lines from the third-party service(s) 132.

As an alternative example to obtain the image data 100, knowing the property lines and the associated coordinates with the property lines may allow for a determination of which tiles include or correspond to the property. These tiles may be obtained (e.g., fetched), for example, from the third-party service(s) 132 by knowing those tiles that include a portion of the property. In other words, those tile(s) (or map data/image data 134) that include the coordinates associated with the property lines may be obtained through a comparison of the coordinates of the property with a comparison of the coordinates of the individual tiles. Using the known coordinates of the property lines, and the coordinates of the associated with the tiles, the image data 100 of the property may be obtained and cropped from the one or more tiles.

In some instances, the detached garage may have been identified by the ML model(s) 114, but upon arriving at the property, the courier personnel 124 may identify a correct location of the detached garage (or a garage). Here, the courier personnel 124 may utilize their personal knowledge of the property upon arriving to determine the correct location of the detached garage. During delivery, a location of the courier device 126, a location of the courier vehicle (e.g., truck), a location of the courier personnel 124, and/or other equipment (e.g., scanner) may be recorded. Such information may be used to deduce where the package was delivered, and/or the route taken by the courier personnel 124 to deliver the package. By recording this as location data 128, for example, such information may be used to further train the ML model(s) 114. For example, the training component 116 may use a location that the package was scanned for delivery, a route of the courier personnel 124 taken on the property, a route of the courier vehicle taken to arrive at the property, and so forth, as feedback to retrain the ML model(s) 114 to more accurately identify detached garages during future deliveries. Moreover, the correct location of the detached garage may be used for future deliveries to that particular address. Still, in other instances, the courier personnel 124 may be asked to confirm the location of the detached garage before, during, or after delivery, and such indications may be used train the ML model(s) 114.

In some instances, when the score 118 output by the ML model(s) 114 is less than the threshold, a low confidence exists that the detached garage was identified. Here, the property may not include a detached garage and/or the detached garage may have been unidentifiable. In these instances, the consumer 104 may be asked to confirm the location of the detached garage (if any), and/or the consumer 104 may be asked to identify the location of the detached garage. For example, the image data 100 of the property may be provided to the consumer 104, on the consumer device 106, and prompts may ask the consumer to identify the detached garage on the property. In another scenario, the image data 100 may be provided to the consumer device 106 and prompts may be provided that ask the consumer 104 to confirm an identified garage. Here, a detached garage may have been identified by the ML model(s) 114, but because the score 118 was less than the threshold, the consumer 104 may be asked to confirm the location of the identified detached garage. In other instances, if the score 118 was less than the threshold, the courier personnel 124 may be instructed to locate the detached garage themselves upon arriving at the property.

In some instances, editing the location of the detached garage may be accomplished via the consumer 104 manipulating a pin on image data 100 displayed via the consumer device 106. The consumer 104 may be permitted to set the location of the detached garage, and such location may be used as a delivery location. The confirmation, denial, or editing of the location of the detached garage may also be used to retrain the ML model(s) 114 to more accurately identify detached garages in future instances. In some instances, the assistance of the consumer 104 to locate the detached garage may be enlisted in instances in which the consumer requests a delivery to the detached garage, but the ML model(s) 114 and/or the courier personnel 124 are unable to locate the detached garage.

In FIG. 1, the courier device 126 is shown displaying an illustrative user interface 136. Here, a detached garage 138 may have been identified on the property, adjacent to a house 140 on the property. The consumer 104 may have selected for the package to be delivered to the detached garage 138 as compared to the house 140. As part of identifying the detached garage 138, a route 142 is determined such that the courier personnel 124 is directed to the detached garage 138 for delivering the package. In the user interface 136, the route 142 is shown being along a service road and/or alleyway, as compared to a street associated with an address of the property (e.g., Oak Street). The user interface 136 may also display indications of whether the courier personnel 124 was able to deliver the package, or unsuccessful in delivering the package (e.g., unable to locate garage).

The remote system 102, the consumer device 106, the courier device 126, the third-party service(s) 132, as well as other device(s), system(s), etc., may be communicatively coupled via one or more network(s) 144. In some instances, the network(s) 144 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The remote system 102, the consumer device 106, the courier device 126, the third-party service(s) 132, as well as other device(s), system(s), etc. on the network(s) 144 may include one or more network interface(s) for communicating with one another.

In some instances, the remote system 102 may be implemented as one or more servers and may, in some instances, form a portion of a network-accessible computing platform implemented as a computing infrastructure of processors, storage, software, data access, and so forth that is maintained and accessible via the network such as the Internet. Cloud-based systems may not require end-user knowledge of the physical location and configuration of the system that delivers the services. Common expressions associated for the remote system 102 may include "on-demand computing", "software as a service (SaaS)", "platform computing", "network-accessible platform", "cloud services", "data centers", and so forth.

As used herein, a processor, such as the processor(s) 110, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 112, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s). The memory 112 is an example of non-transitory computer-readable media. The memory 112 may store an operating system and one or more software applications, instructions, programs, and/or data to implement the methods described herein and the functions attributed to the various systems.

Figure 2:
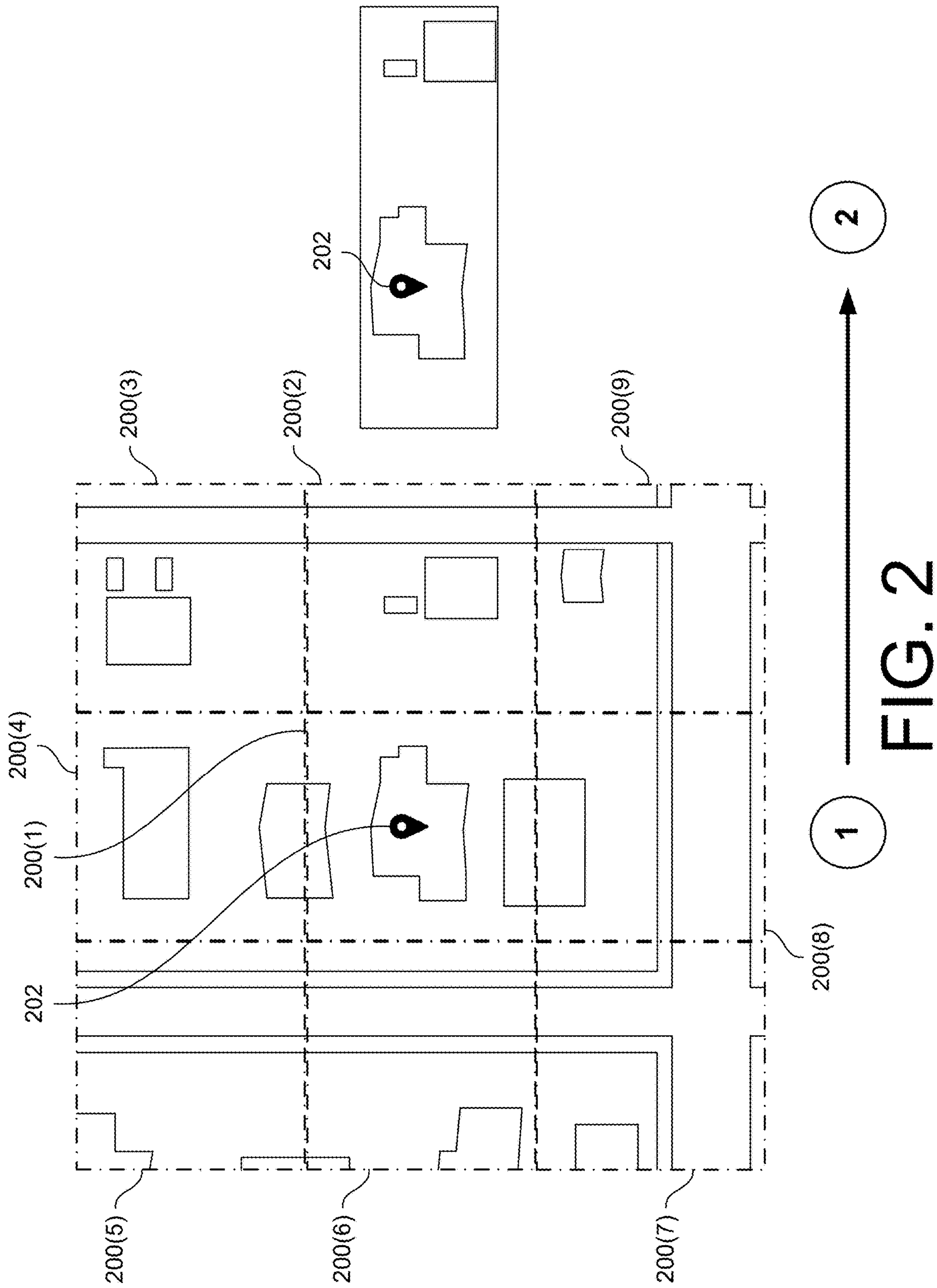
FIG. 2 illustrates an example technique associated with obtaining image data for identifying a location associated with a detached garage, according to examples of the present disclosure.

FIG. 2 illustrates an example scenario for obtaining tiles 200 associated with a property, according to an example of the present disclosure. Upon determining a delivery to an address, the remote system 102 may determine, or enlist the assistance of the third-party service(s) 132 to determine, the image data 100 representing the property associated with the address. For example, if the address is 123 Oak Street, the remote system 102 may communicate with the third-party service(s) 132 to obtain the image data 100 of 123 Oak Street.

Oftentimes, the property is discretized into tiles 200 represented within the map data/image data 134. The address of the property may also be expressed as a pin 202 placed on one of the tiles 200. For example, when searching for the address of 123 Oak Street, the pin 202 may indicate the location of 123 Oak Street. Using the location of the pin 202, a first tile 200(1) including the pin 202 may be obtained. For example, the first tile 200(1) that includes the pin 202 may be obtained. In some instances, the first tile 200(1) may be centered around the pin 202 (e.g., the pin 202 may be located in a center of the first tile 200(1)), however, in other instances, the pin 202 may be located within the first tile 200(1) differently than shown.

The first tile 200(1) may be associated with certain coordinates (e.g., geocoordinates, GPS coordinates, latitude, longitude, etc.), where the coordinates indicate boundaries of the first tile 200(1) (e.g., top-left corner, top-right corner, bottom-left corner, bottom-right corner). However, the first tile 200(1) may or may not include an entirety of the property. That is, the first tile 200(1) may only represent a portion of the property. To obtain an entirety of the property (or an image with an entirety of the property), surrounding tiles 200 that are adjacent to the first tile 200(1) may be obtained. For example, knowing the coordinates of the first tile 200(1), a second tile 200(2), a third tile 200(3), a fourth tile 200(4), a fifth tile 200(5), a sixth tile 200(6), a seventh tile 200(7), an eighth tile 200(8), and a ninth tile 200(9) may be obtained.

After obtaining the tiles 200 (e.g., tiles 200(1)-(9)), the tiles 200 may be stitched together. As noted above, each of the tiles 200 may be associated with respective map data/image data 134. Once the tiles are stitched together, the image data 100 may depict an entirety of the property as well as adjacent or surrounding properties. From here, property lines of the property may be determined for cropping the tiles 200 (or the image) to obtain image data 100 that is provided to the ML model(s) 114.

In some instances, the property lines may be obtained from a database or third-party service(s) 132. The property lines may be expressed as coordinates, and the coordinates of the property lines may be compared against the coordinates of the tiles 200. This comparison may be used to crop the tiles 200 to the property lines of the property. In other words, as each of the tiles 200 are associated with certain coordinates, by knowing the coordinates of the property, the tiles 200 may be cropped accordingly. In some instances, prior to cropping the tiles 200, a determination may be made whether the tiles 200 represent the property. For example, the coordinates of the property lines may be compared to the coordinates of the tiles 200 to determine whether the coordinates of the property lines are represented within the tiles 200. This may ensure that an entirety of the property is contained within the tiles 200.

From "1" to "2" in FIG. 2, the tiles may be cropped to obtain image data 100 representing the property. The cropped image as obtained at "2" may be input into the ML model(s) 114 for determining the location of the detached garage. The pin 202 is shown being located within/on a house. In an embodiment the third-party service(s) 132 may place the pin 202 on the house, or a center of the house, and such placement may be used to determine the location of the house on the property. For example, knowing the location of the pin 202 may be used by the ML model(s) 114 to place a bounding box around the structure on which the pin 202 is located. Knowing the location of the house may be used to know the location of the detached garage. For example, knowing that one structure in the image data 100 is the house may be used to understand that a second structure in the image data 100 is the detached garage.

Although the discussion herein is with regard to cropping the image data 100 to the property, in some instances, the image data 100 may be cropped to include adjacent property(ies) (whether partial or complete). This may assist in identifying roadways, alleyways, vehicles, etc. that are not within the property lines of the property, but which are helpful to the ML model(s) 114 to identify the detached garage. For example, these objects may be useful in identifying the detached garage and/or a route for the courier personnel 124 to take when traveling to the detached garage. In some instances, the property lines may be indicated within the image data 100 that is input into the ML model(s) 114, thereby allowing the ML model(s) 114 to search within the property lines for the house and the detached garage. However, the ML model(s) 114 may be trained to determine contextual clues, outside of the property lines, such as roadways, service road, alleyway, etc. for locating the detached garage and/or how to travel to the detached garage.

Figure 3:
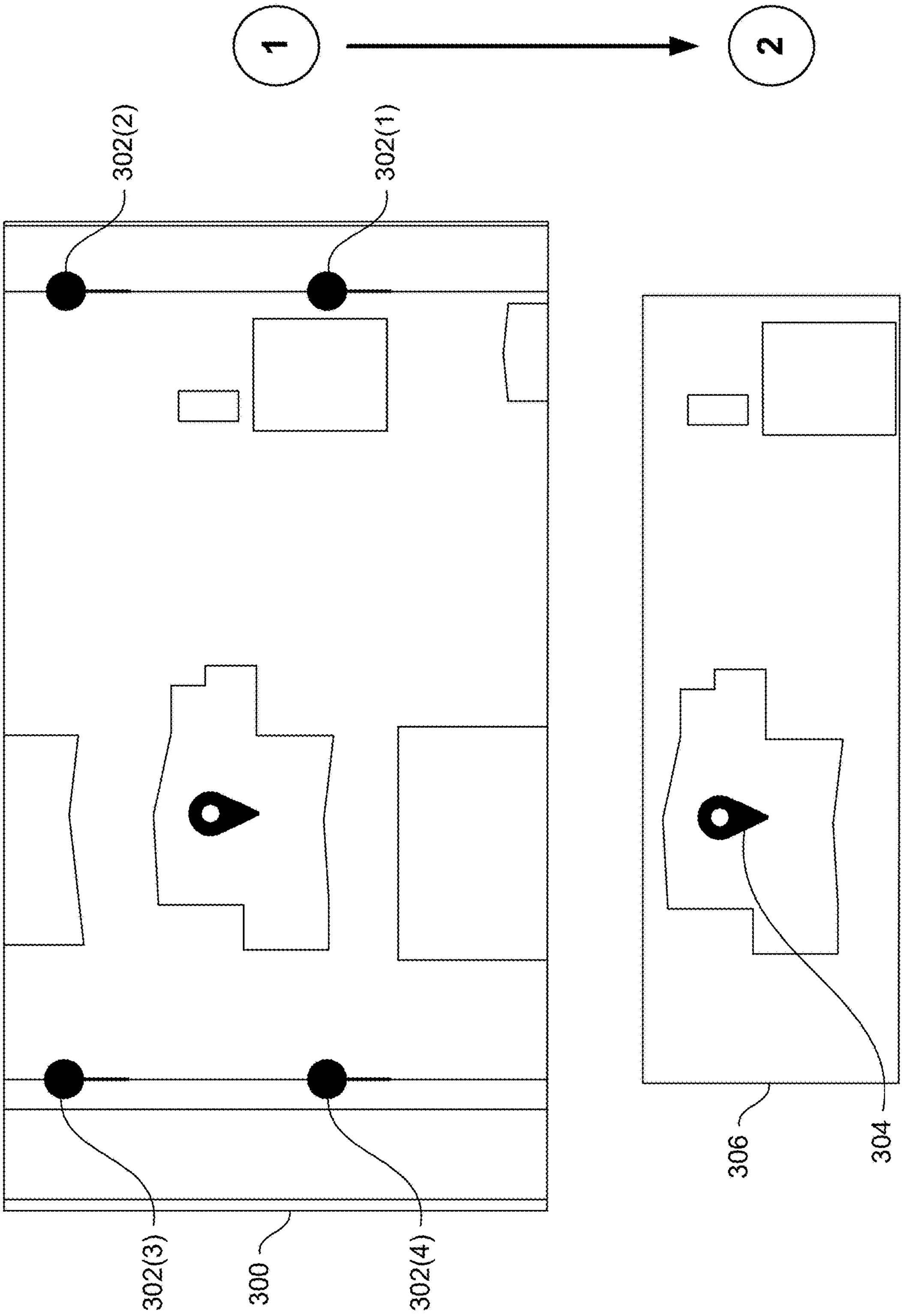
FIG. 3 illustrates an example technique associated with obtaining image data for identifying a location associated with a detached garage, according to examples of the present disclosure.

FIG. 3 illustrates an example scenario for cropping image data, according to an example of the present disclosure. At "1" if FIG. 3, first image data 300 may be obtained that is associated with a property. In some instances, the first image data 300 may be obtained from the third party service(s) 132, for example. The property may be defined via one or more coordinates 302, such as a first coordinate 302(1), a second coordinate 302(2), a third coordinate 302(3), and a fourth coordinate 302(4). In some instances, the coordinates 302 may be used to obtain the first image data 300. For example, knowing the property lines and the associated coordinates with the property lines may allow for a determination of which tiles 200 include or correspond to the property. These tiles 200 may be obtained (e.g., fetched), for example, by knowing those tiles 200 that include a portion of the property. In other words, those tiles 200 (or image(s)) that include the coordinates associated with the property lines may be obtained (e.g., through a comparison of the coordinates of the property with a comparison of the coordinates of the individual tiles).

Once the first image data 300 is obtained, the coordinates 302 may be used to crop the first image data 300. In some instances, the first image data 300 may represent the property, or the first image data 300 may be cropped to represent the property. That is, the tiles 200 may include property other than the property, or may in some instances, include only the property of interest. At "2" in FIG. 3, the first image data 300 is shown being cropped to generate second image data 306 that represents the property. As similarly discussed above with regard to FIG. 2, a pin 304 may be located on a house of the property (or at the address). The pin 304 may be used to determine the location of the house, which may correspondingly be used to determine the location of the detached garage.

Although the discussion herein is with regard to cropping the first image data 300 to the property, in some instances, the first image data 300 may be cropped to include adjacent property (whether partial or complete), as similarly discussed above with regard to FIG. 2.

Figure 4:
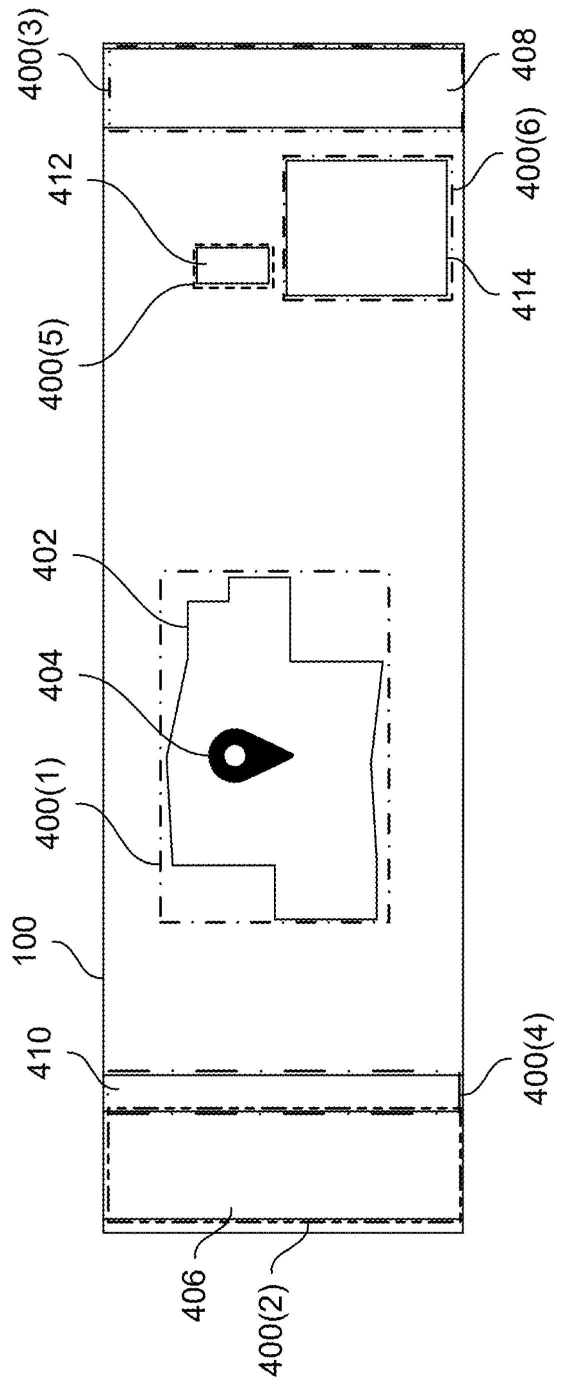
FIG. 4 illustrates an example technique for determining objects within image data for identifying a location associated with a detached garage, according to examples of the present disclosure.

FIG. 4 illustrates an example scenario for placing bounding boxes 400 around objects detected in the image data 100, according to an example of the present disclosure. In some instances, the objects detected within the image data 100 may include an associated score 118, for example, a confidence that the detected objects corresponds to a house, vehicle, detached garage, etc., as will be explained herein.

The image data 100 shown in FIG. 4 illustrates a cropped image of the property, which includes adjacent roadways, alleyways, etc. for determining a surrounding context of the property, and where the cropped image is input in the ML model(s) 114. The ML model(s) 114 are trained to identify various objects in the image data 100. For example, the ML model(s) 114 may be trained to identify a house 402 on the property. The house 402 may be located at least in part by a pin 404 that resides on/within the house 402. For example, as discussed above, the map data/image data 134 may include the pin 404 as corresponding to the address of the property, where the pin 404 may be located on the house 402. As part of identifying the house 402, the ML model(s) 114 may bound the house 402 with a first bounding box 400(1). In some instances, the house 402 may additionally or alternatively be identified via a size of the house 402 (e.g., a largest structure on the property), roof lines on a roof of the house 402, sidewalks leading to the house 402, a location of a structure on the property (e.g., centered on the property), and so forth.

The ML model(s) 114 may also be trained to identify a roadway 406 adjacent to the property. The roadway 406 may be identified via labels on the map data/image data 134 (e.g., metadata) indicating a name of the roadway The ML model(s) 114 may bound the roadway 406 with a second bounding box 400(2). Additionally, the ML model(s) 114) may identify an alleyway 408 adjacent to the property. In an embodiment, the alleyway 408 may be identified via detecting a cleared area (e.g., void of brush, structures, etc.), a width of the cleared area, a length of the cleared area, and so forth. The ML model(s) 114 may bound the alleyway 408 with a third bounding box 400(3). Additionally, the ML model(s) 114 may identify a sidewalk 410 adjacent to the roadway 406. In some instances, the sidewalk 410 may be identified via having a location adjacent to the roadway 406. The sidewalk 410 may be bound with a fourth bounding box 400(4). In some instances, the location of the roadway 406, the alleyway 408, and/or the sidewalk 410 may be used to determine an orientation of the house 402, for example, a front of the house 402 and a back of the house 402.

The ML model(s) 114 may also identify a vehicle 412 on the property. The vehicle 412 may be identified via color, size, shape, and/or a location relative to other objects identified by the ML model(s) 114. For example, knowing the location of the alleyway 408, an object corresponding to the vehicle 412 may be deduced as a vehicle knowing the location next to the alleyway 408 (e.g., as vehicles may travel on the alleyway 408). The vehicle 412 may be bound with a fifth bounding box 400(5).

The ML model(s) 114 may also identify a detached garage 414 on the property. In some instances, the detached garage may be identified via a location next to the alleyway 408, the vehicle 412 being adjacent to the detached garage 414, a size of a structure corresponding to the detached garage 414, and so forth. For example, knowing the size of the detached garage 414 may be used to determine that the structure is detached (and separate) from the house 402 and that the detached garage 414 in fact represents a detached garage on the property. The ML model(s) 114 may bound the detached garage 414 with a sixth bounding box 400(6).

In some instances, the ML model(s) 114 may place labels on the objects that are bound with the bounding boxes 400. Moreover, for each of the objects, the ML model(s) 114 may have a certain confidence that the house 402 corresponds to a house, the detached garage 414 corresponds to a detached garage, the vehicle 412 corresponds to a vehicle, and so forth. Additionally, by placing the bounding boxes 400 around the objects, the ML model(s) 114 may be able to determine a location of the objects on the property, which may be used for routing the courier personnel 124 to the detached garage 414 for delivering a package.

Figure 5A:
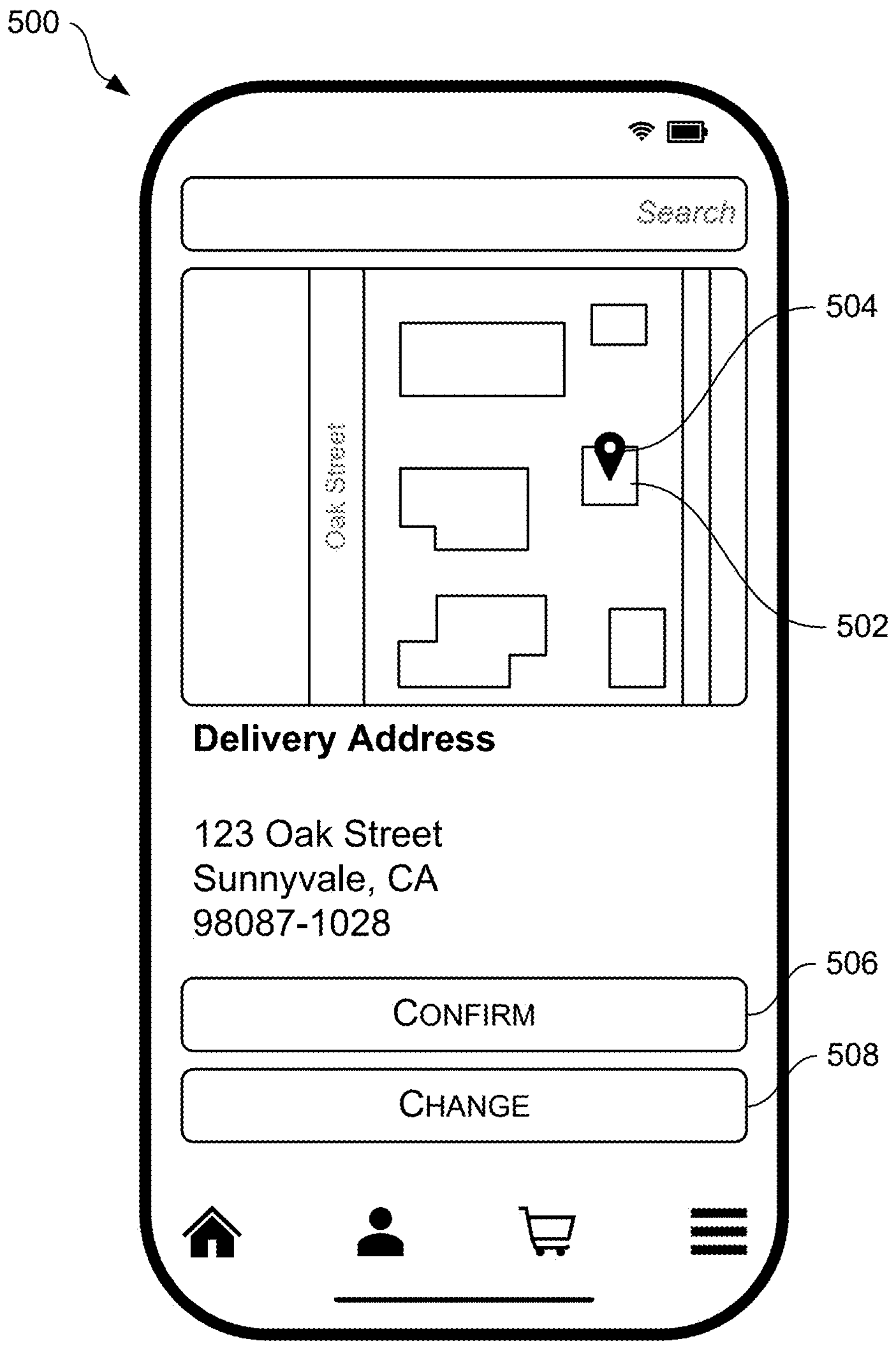
FIGS. 5A and 5B illustrate example user interfaces associated with identifying a location of a detached garage, according to examples of the present disclosure.
Figure 5B:
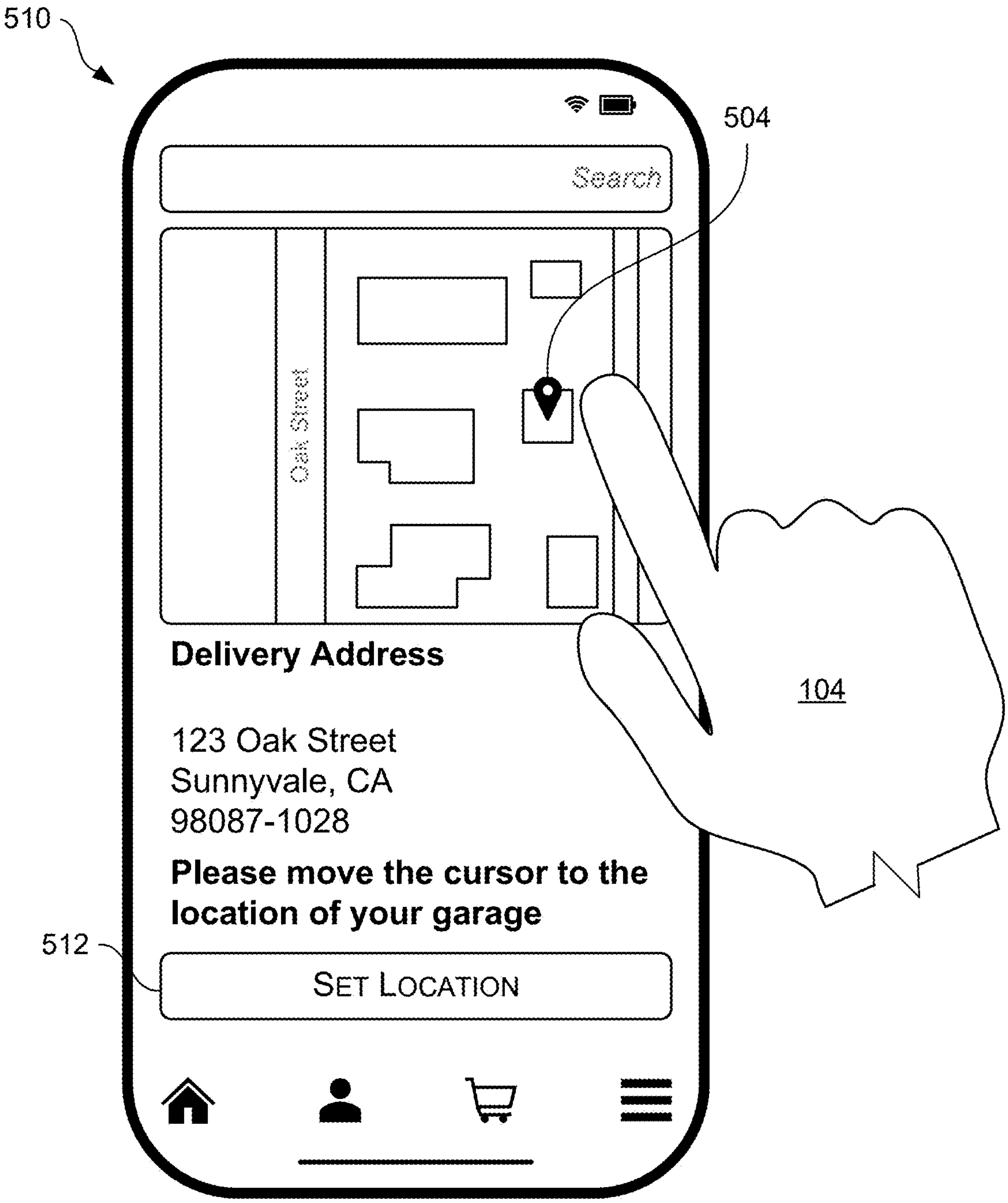

FIGS. 5A and 5B illustrate example user interfaces associated with requesting a consumer 104 to confirm or edit an identified location of a detached garage. For example, after inputting the image data 100 to the ML model(s) 114, and determining the location of the detached garage, in some instances the consumer 104 may be asked to confirm the location. In FIG. 5A, for example, a user interface 500 is shown displaying image data 100 that includes the property of the consumer 104, and a pin 504 located on the determined location of a detached garage 502. The consumer 104 may provide input (e.g., touch) to a first indication 506 on the user interface 500 to confirm the location of the detached garage 502, or may provide input to a second indication 508 on the user interface 500 to change the location of the detached garage 502. However, other indications (e.g., incorrect location) may be displayed.

In instances in which the consumer 104 provides input to the first indication 506, the location of the detached garage 502 may be confirmed. In some instances, data associated with the confirmation of the location of the detached garage 502 may be provided back into the ML model(s) 114 to increase an accuracy of the ML model(s) 114 identifying detached garages. Comparatively, if the consumer 104 desires to change the location of the detached garage 502, the consumer 104 provides input to the second indication 508, and a user interface 510 may be displayed (as shown in FIG. 5B).

On the user interface 510, the consumer 104 may provide touch input to, for example, drag and drop the pin 504 to a location on the property corresponding to the detached garage 502. In some instances, an initial location of the pin 504 may be placed at a location as determined from the ML model(s) 114. As part of dragging and dropping the pin 504, the location of the pin 504 may be recorded, and when the consumer 104 provides input to a third indication 512, the location of the pin 504 may be set as the location of the detached garage 502. This location, as set by the consumer 104, may be used to determine the delivery route for delivering the package to the consumer 104. Moreover, the location of the detached garage 502 may be used to further train the ML model(s) 114.

Although a particular method is shown for allowing the user to set the location of the detached garage, the consumer

104 may utilize arrows, trackpads, styluses, etc. for moving the location of the pin 504, or otherwise setting the location of the detached garage 502.

FIGS. 6-9 illustrate various processes related to determining whether a property contains a detached garage. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, devices, architectures, diagrams, and systems described in the examples herein, such as, for example those described with respect to FIGS. 1-5, although the processes may be implemented in a wide variety of other environments, architectures, and systems.

Figure 6:
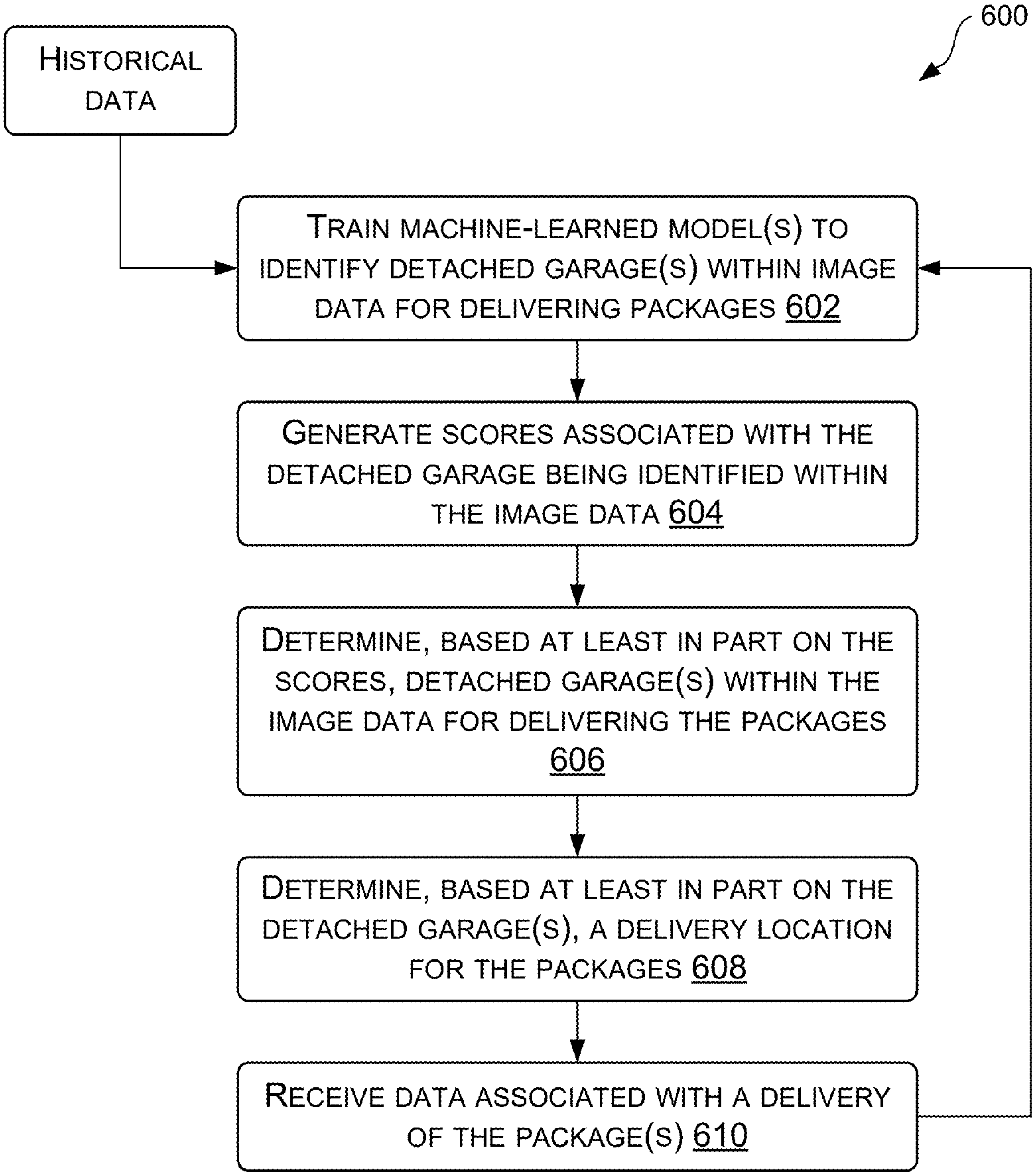
FIG. 6 illustrates an example process for training a machine-learned model to identify a location associated with a detached garage, according to examples of the present disclosure.

FIG. 6 illustrates an example process 600 for training ML model(s), such as the ML model(s) 114, to identify detached garages or an absence of detached garages, according to an example of the present disclosure. In some instances, the process 600 may be performed by the remote system 102, other communicatively coupled devices and systems, and so forth. The ML model(s) 114 may be trained to determine trust scores related to determining whether a detached garage is present within the image data 100

As discussed above, the remote system 102 may have access to, or store, the image data 100. For example, the remote system 102 may subscribe to the third-party service(s) 132 to obtain the image data 100, which represents satellite or aerial images (e.g., satellite imagery). The third-party service(s) 132 may include suitable components that collect and store the map data/image data 134 associated with certain addresses, properties, and so forth. This data may be made available to the remote system 102 for training the ML model(s) 114. Additionally, or alternatively, the remote system 102 may store and/or maintain a database associated with the properties. Regardless of where the data is stored, this data may be organized within a datastore in any suitable manner to associate individual properties with relevant portions of the data.

At 602, the process 600 may include training one or more machine-learning model(s) to identify detached garage(s) within image data for delivering packages. For example, the remote system 102 may include the training component 116 that trains the ML model(s) 114 using historical data. In some instances, the remote system 102 may access a portion of the historical data associated with a sampled set of properties with detached garage(s) and use the sampled data to train the ML model(s) 114. Additionally, or alternatively, the historical data may include properties that do not have detached garage(s) for training the ML model(s) 114 to identify and label those properties where delivery to a detached garage is not possible.

In some instances, the portion of the data used as training data may be represented by a set of characteristics that is labeled with a label indicating whether structures and objects were identified in the image data 100. For example, the labels may indicate whether a house, detached garage, other structures (e.g., shed, pergola, etc.), vehicle, walkways, alleyways, service roads, etc. were located. For example, if an identified structure has a certain size, or is located adjacent to a roadway, these characteristic(s) may be used as one of multiple labels for a particular piece of property. In another example, a pin within the map data/image data 134 may be used to determine a location of a house on the property. In this manner, a supervised learning approach may be taken to train the ML model(s) to predict whether a property has a detached garage.

The training component 116 may be configured to train the ML model(s) 114 using a portion of the image data 100 (and/or historical data) in the datastore that is associated with a sampled set of map data/image data 134 of the properties. Discussed herein, the ML model(s) 524 is/are usable by the scoring component 120 to determine the scores 118 (e.g., trust scores) for a plurality of properties as to whether the property contains a detached garage and additionally, the location of the detached garage on the property.

Additionally, in some instances, at least some of the historical data may have been generated from properties that have known detached garages. For example, the historical data accessed may represent properties that include detached garages, based on the detached garage exhibiting certain characteristic(s) (e.g., adjacent to roadway, vehicle parked outside, certain distance/location relative to house, etc.). As part of training the ML model(s) 114, the remote system 102, via the training component 116, may label each characteristic of the sampled set of properties with a label that indicates whether the characteristic is associated with the property including a detached garage or a characteristic that is associated with the property not including the detached garage. Examples of labels are described herein, such as whether a location of a structure is indicative of the structure being a detached garage, whether a size of the structure is indicative of being a detached garage, whether an orientation of the structure is indicative of being a detached garage, whether a color (e.g., roof color) of the structure is indicative of being a detached garage, whether roadways, alleyways, vehicles, etc. are located within a proximity of the structure, and so forth. However, the labels may correspond to other types of characteristics.

In some instances, training the ML model(s) 114 at 602 may include applying or setting weights for machine learning. These weights may apply to a set of features derived from the historical data. In some embodiments, the weights may apply to parameters that are internal to the ML model(s) 114 (e.g., weights for neurons in a hidden-layer of a neural network). These internal parameters of the ML model(s) 114 may or may not map one-to-one with individual input features of the set of features. It is to be understood that the ML model(s) 114 may be retrained using updated historical data (e.g., the image data 100) to obtain a newly trained ML model(s) 114 that is adapted to properties that have and do not have a detached garage. This allows the ML model(s) 114 to adapt, over time, to changing characteristics.

At 604, the process 600 may include generating scores associated with the detached garage being identified within the image data. For example, in some instances, the scoring component 120 may score the image data 100, or structures therein, using the ML model(s) 114. For example, the scoring component 120 may access, from the memory 112, the image data 100 associated with the property or as obtained from the third-party service(s) 132 (e.g., the map data/image data 134). The image data 100, as discussed above, may be cropped to the property lines of the property, or may include portions of adjacent properties. Regardless, the image data 100 may represent an entirety of the property and include identifiers of the property lines. The image data 100 is provided as an input to the ML model(s) 114, and as an output, the score 118 is generated from the ML model(s) 114. These scores 118 relate to the probabilities of the property including the detached garage or not including the detached garage. For example, in the case of the property not including the detached garage, a "low" score may relate to the probability of the property not including the detached garage. In the case of the property including a detached garage a "high" score may relate to the probability of the property including the detached garage. Different classifiers, or identifiers, may be used or associated with the house and/or the detached garage. Moreover, in some instances, the scores 118 may relate to the house and/or the detached garage being identified, or unidentifiable within the image data 100.

At 606, the process 600 may include determining, based at least in part on the scores, detached garage(s) within the image data for delivering the packages. For example, with the scores 118, the remote system 102 may be configured to determine whether the property includes a detached garage. In some instances, the remote system 102 may receive the scores 118 and compare these scores 118 to a threshold, or certain predetermined level. If the scores 118 are greater than the threshold, or satisfy the threshold, the detached garage may be located on the property. If the scores 118 are less than the threshold, or do not satisfy the threshold, the detached garage may have been unable to be located on the property (or the property does not include a detached garage).

In some instances, rather than outputting a score, the ML model(s) 114 may output indications or labels indicating the detached garage. For example, the indications or labels may indicate whether a structure is a "detached garage." In some instances, the structure identified as the detached garage may not been associated with a certain location, size, color, per se for comparison with reference characteristic(s), but rather, a label indicating whether the structure is a detached garage.

At 608, the process 600 may include determining, based at least in part on the detached garage, a delivery location for the packages. For example, in instances in which the detached garage is detected on the property, the coordinates of the detached garage may be determined. In some instances, the coordinates of the detached garage may be determined via the map data/image data 134. More particularly, knowing the location of the bounding box within the image data 100, that is, the location of the detached garage, the bounding box may be used to determine coordinates of the detached garage. The delivery location may also be determined via identifying roadways, alleyways, etc. adjacent to the detached garage.

At 610, the process 600 may include receiving data associated with a delivery of the package. For example, while making a delivery, feedback from the courier personnel 124, via the courier device 126, may be used to provide indications of where the package was delivered, how the courier personnel 124 traveled to the delivery location, and so forth. This data may be used as feedback to further train the ML model(s) 114. For example, if the courier personnel 124 was instructed to deliver the package to a certain location on the property though to be the detached garage, but after arriving at the delivery location the courier identified a correct location of the detached garage, data of the correct location may be used to retrain the ML model(s) 114. In some instances, the data may be generated via location sensor(s) onboard the courier vehicle, the courier device 126, a scanner used by the courier personnel 124, and so forth.

Figure 7:
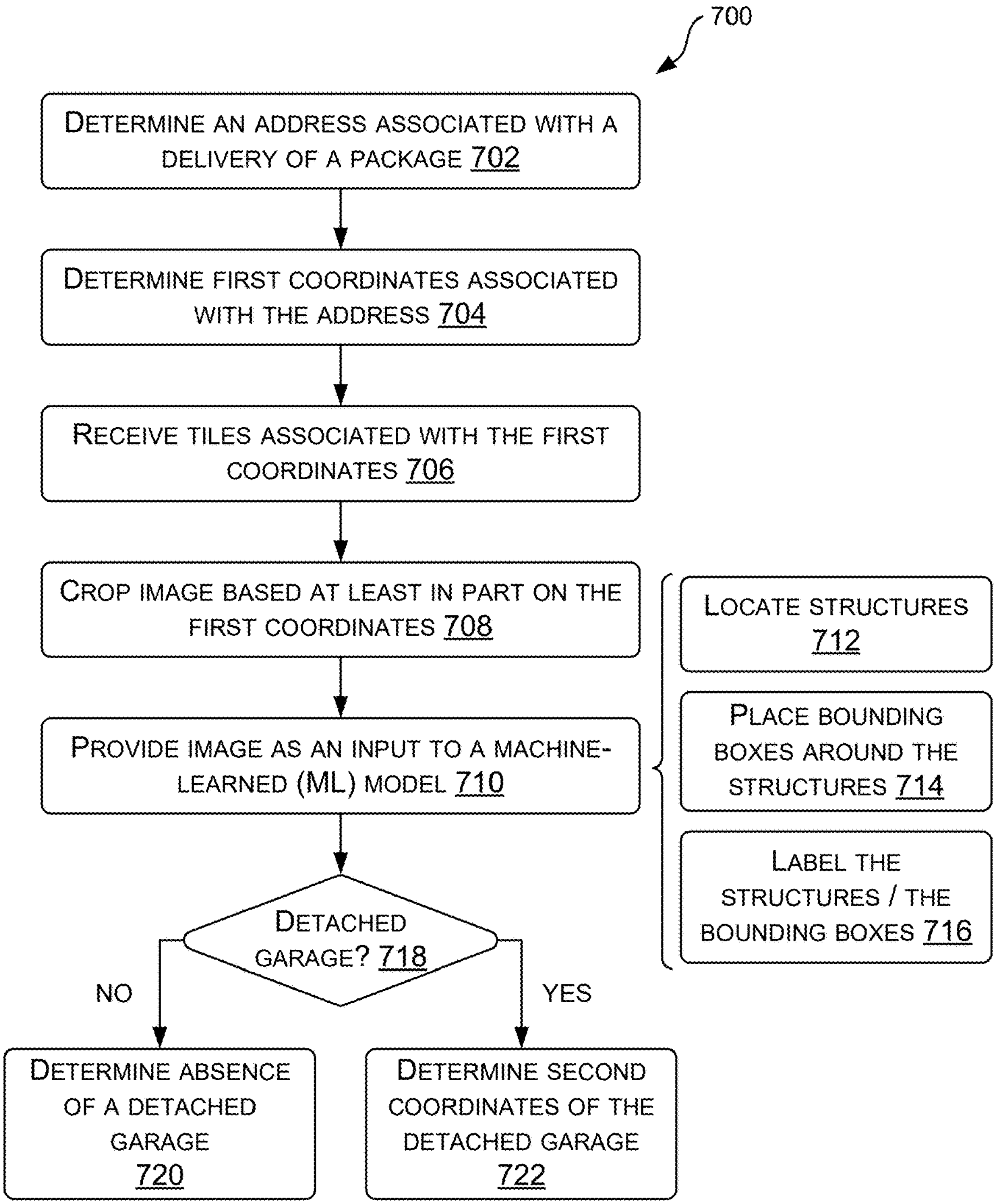
FIG. 7 illustrates an example process for determining a presence of a detached garage, according to examples of the present disclosure.

FIG. 7 illustrates an example process 700 for determining a presence or absence of a detached garage on a property, according to an example of the present disclosure.

At 702, the process 700 may include determining an address associated with a delivery of a package. For example, as part of an order being placed for one or more item(s), the remote system 102 may determine an address associated with a delivery of the order. In some instances, the remote system 102 may be associated with a retailer fulfilling the order, or may be separate from the retailer.

At 704, the process 700 may include determining first coordinates of the address. For example, once the address associated with the delivery is known, coordinates of the address may be obtained. In some instances, the coordinates may be associated with a center of the property, or may be associated with a house located on the property. Additionally, the coordinates may be associated with property lines of the address, where the coordinates indicate corners, edges, boundaries, etc. of the property lines. In some instances, the coordinates may be obtained via the remote system 102 through a subscription to a third-party service(s) 132.

At 706, the process 700 may include receiving tiles associated with the first coordinates. For example, knowing the coordinates of the property, the remote system 102 may receive the tiles from the third-party service(s) 132. Each of the tiles may be associated with an image of the property, or a portion of the property. For example, depending upon the size of the property, multiple tiles may represent the property. In some instances, the first coordinates may be used to ensure that an entirety of the property, as represented across multiple tiles, are received. Moreover, the tiles may also include images of neighboring properties. That is, a particular tile may represent two different pieces of property.

At 708, the process 700 may include cropping an image based at least in part on the first coordinates. For example, after the tiles are obtained, the tiles may be stitched together to generate an image that includes the property. However, the image may be cropped to represent only the piece of property in question. In some instances, the image may be cropped based on the first coordinates. For example, as the tiles may be associated with other properties, adjacent to the property in question, the first coordinates may be used to crop the image. However, in some instances, the image may be cropped to include property beyond the property in question in order to assist in identifying structures on the property, objects on the property, characteristics of the property, and so forth. As an example, knowing adjacent roadways may be used to deduce the presence and/or location of a detached garage. In some instances, a certain threshold (e.g., amount of pixels) beyond the first coordinates may be used to crop the image.

At 710, the process 700 may include providing the image into a machine learning (ML) model. For example, the ML model(s) 114 may be utilized to determine whether the property includes a detached garage. In some instances, as part of determining whether the property includes a detached garage, the process 700 may locate structures, at 712, place bounding boxes around the structures, at 714, and/or label the structures/the bounding boxes, at 716. Whether the property includes the detached garage may include the ML model(s) 114 identifying structures on the property, and within the image data 100. In some instances, the ML model(s) 114 may identify structures external to the house. As discussed above, the house may be identified based at least in part on a pin that is located on the house within the map data/image data 134. Knowing the location of the house may be used to determine other structures on the property, as well as an identification of those structures (e.g., in relation to the house, size, location next to alleyways, service roads, etc.).

At 718, the process 700 may include determining whether a detached garage was located. For example, the ML model(s) 114 may be trained to identify, from the image data 100, a detached garage on the property. In some instances, the ML model(s) 114 may output a score 118 associated with identifying a detached garage on the property, and from the score 118, the presence of the detached garage may be determined. If at 718 the process 700 determines that the detached garage was not located, the process 700 may follow the "NO" route and proceed to 720.

At 720, the process 700 may include determining an absence of the detached garage. For example, because the detached garage was not identified form the image data 100, or the score 118 output from the ML model(s) 114 may less than a threshold, the process 700 may determine an absence of the detached garage. In these instances, the delivery of the package may be made to the front of the house (e.g., doorstep, front porch, etc.).

Alternatively, it at 718 the process 700 determines that the detached garage was identified, the process 700 may follow the "YES" route and proceed to 722. At 722, the process 700 may include determining second coordinates of the detached garage. For example, once the detached garage is identified within the image data 100, coordinates of the detached garage may be determined. The coordinates may be used for instructing the courier personnel 124 as to the location of the detached garage for purposes of delivering the package to the detached garage. In some instances, the coordinates of the detached garage may be determined via a bounding box placed around the detached garage, and associating the bounding box with certain coordinates (e.g., from the map data/image data 134).

Figure 8:
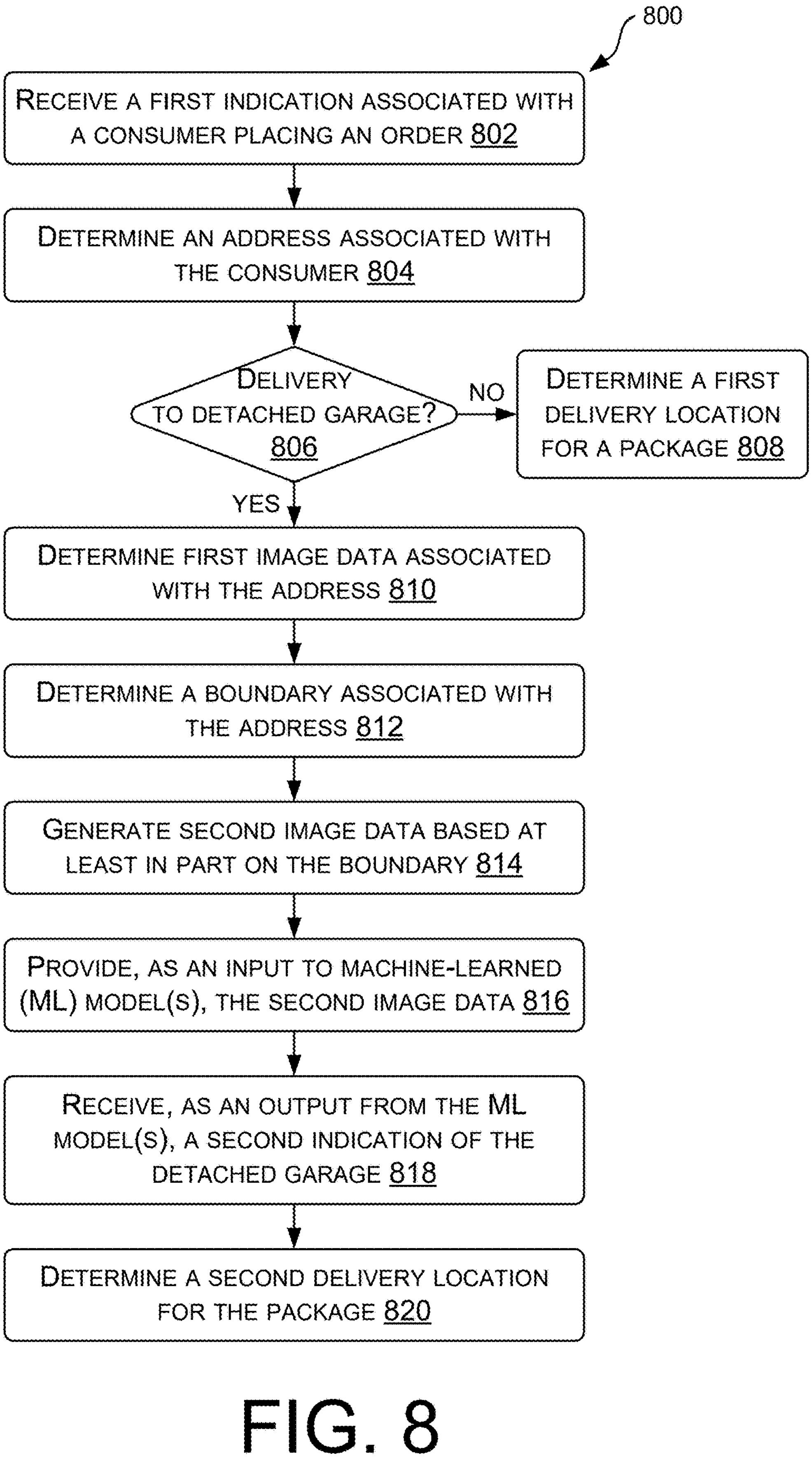
FIG. 8 illustrates an example process for determining a delivery location of a package, according to examples of the present disclosure.

FIG. 8 illustrates an example process 800 for determining a delivery location of a package, according to an embodiment of the present disclosure. At 802, the process 800 may include receiving a first indication associated with a consumer placing an order. For example, a consumer may place an order for one or more item(s). At 804, the process 800 may include determining an address associated with the consumer. For example, as part of an order being placed for one or more item(s), the remote system 102 may determine an address associated the consumer. In some instances, the remote system 102 may be associated with a retailer fulfilling the order, or may be separate from the retailer.

At 806, the process may include determining whether the delivery is to a detached garage. For example, consumers may have the ability to determine where they would like their packages delivered (e.g., delivery preference). Consumer may desire their packages to be delivered to their front steps, porch, etc., or may desire their packages to be delivered to their garage. The consumer 104 may set their preferences in the profile(s) 108, and as orders are placed, the remote system 102 may determine how the packages are to be delivered. If at 806, the process 800 determines that the delivery is not to the detached garage, the process 800 may follow the "NO" route and proceed to 808. At 808, the process 800 may include determining a first delivery location of the package. For example, in instances in which the package is not delivered to detached garage, the package may be delivered to the front porch, steps, etc. of the house. The first delivery location may also be associated with a route to be taken by the courier personnel 124 to deliver the package.

Alternatively, if at 806 the process 800 determines that the delivery is to the detached garage, the process 800 may follow the "YES" route and proceed to 810. At 810, the process 800 may include determining first image data associated with the address. For example, when the delivery is to the detached garage, the remote system 102 may determine image data 100 associated with the address. In some instances, the remote system 102 may communicate with the third-party service(s) 132 to determine the first image data. Coordinates of the address may be used to determine the first image data. As explained above, the first image data may represent individual tiles of the map data/image data 134 that are stitched together.

At 812, the process 800 may include determining a boundary associated with the address. For example, the remote system 102 may determine property lines of the address, or may communicate with one or more third-party service(s) 132 to determine the property lines. The property lines of the address may be associated with coordinates (e.g., geocoordinates) representing the boundaries of the property.

At 814, the process 800 may include generating second image data based at least in part on the boundary. For example, using the property lines, or the boundary of the address, the remote system 102 may crop the first image data to generate the second image data. The second image data may represent the address, or the property associated therewith. In some instances, the second image data may include property of adjacent parcels to determine a context of structures, features, etc. located at the property. For example, the second image data may include the property of the address, as well as a buffer (e.g., threshold amount of pixels) that extend beyond the property of the address.

At 816, the process 800 may include providing, as an input to machine learning (ML) model(s), the second image data. For example, image analysis and/or ML model(s) 114 may be used to determine whether the property (from the second image data) includes a detached garage. In some instances, the ML model(s) may determine characteristics of the property from the image data, such as a location of structures on the property, a size of the structures, a shape of the structures, a location of the structures relative to alleyways, roadways, etc. These characteristic(s) may be compared against reference characteristic(s) that are indicative of whether the property includes or does not include a detached garage.

At 818, the process 800 may include receiving, as an output from the ML model(s), a second indication of the detached garage. In some instances, the second indication may be associated with a score 118 as to the identification of the detached garage within the second image data. For example, the score 118 may relate to a probability or likelihood of the property including a detached garage, or not including a detached garage.

At 820, the process 800 may include determining a second delivery location for the package. For example, once the detached garage is identified, the remote system 102 may determine coordinates of the detached garage. The coordinates of the detached garage may be used as the delivery location, and the coordinates may also be used to determine a route for the courier personnel 124 to travel to the detached garage and deliver the package.

Although the process 800 is described as processing the image data 100 to determine the location of the detached garage, in some instances, the location of the detached garage may already be known from previous deliveries. As such, once the location of the detached garage is determine from the image data 100, the location of the detached garage may be known by accessing the profile(s) 108, and during subsequent order(s), the process 800 may not need to process the image data 100 to determine the location of the detached garage. Furthermore, although the discussion herein relates to detecting detached garages for delivery of packages, the process 800 detached other structures (e.g., shed, backdoor, etc.) for determining a delivery location of the packages. Moreover, rather than detecting detached garages for delivering packages, the detection of detached garage may be used for other purposes as well (e.g., pickups, deliveries, etc.).

Figure 9:
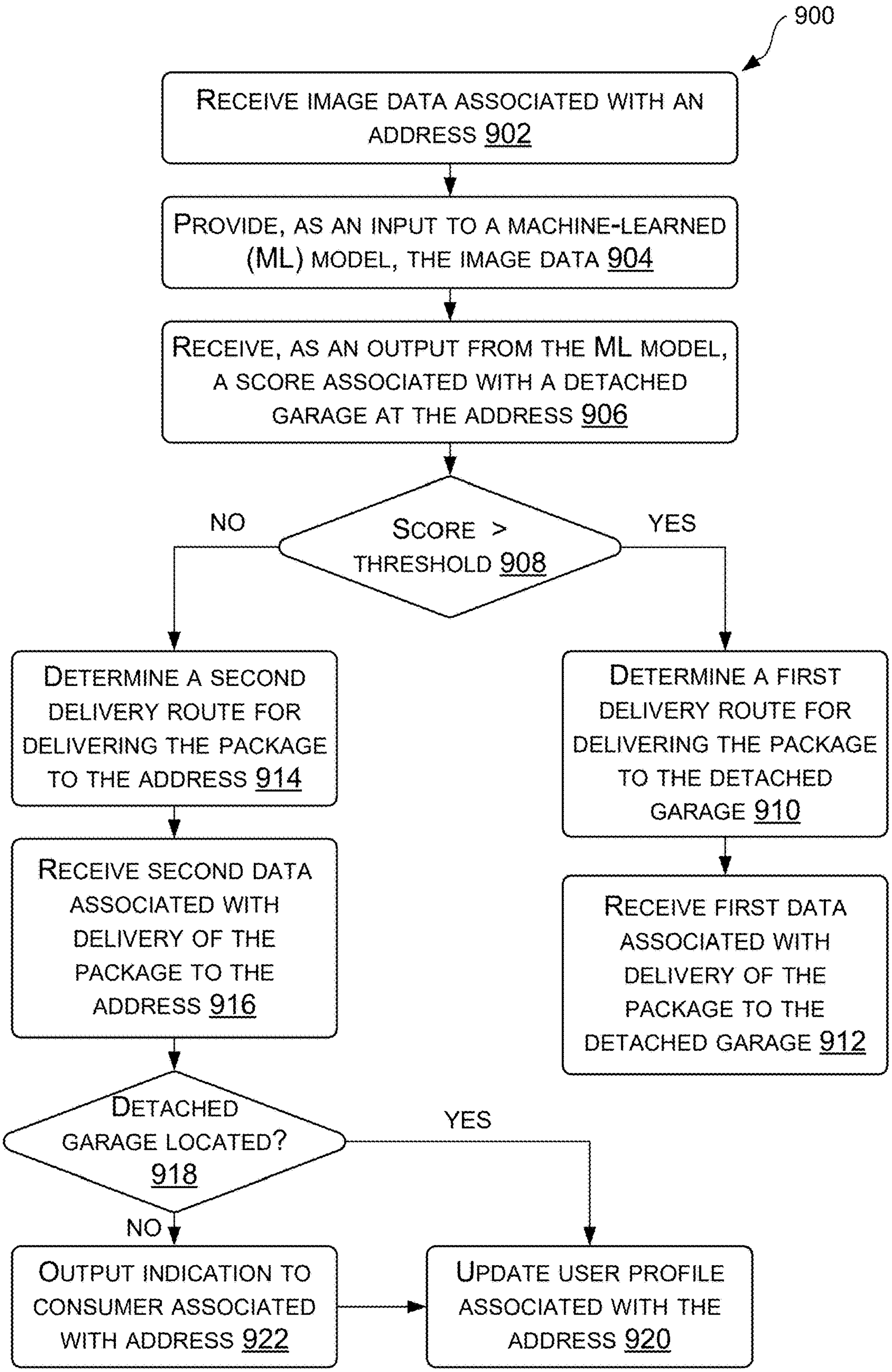
FIG. 9 illustrates an example process for determining a presence of a detached garage for use in a delivery location of a package, according to examples of the present disclosure.

FIG. 9 illustrates an example process 900 for determining a delivery location of a package, according to an embodiment of the present disclosure. At 902, the process 900 may include receiving image data associated with an address. The image data 100 may be received via third-party service(s) 132, and may be associated with an address in which a delivery is to be made. The image data 100 may represent satellite or aerial images (e.g., tiles) of the address.

At 904, the process 900 may include, providing, as an input to a machine learning (ML) model, the image data. For example, image analysis and/or the ML model(s) 114 may be used to determine whether the property (from the image data 100) includes a detached garage. In some instances, the ML model(s) may determine characteristics of the property from the image data 100, and the characteristic(s) 122 may be compared against reference characteristic(s) that are indicative of whether the property includes or does not include a detached garage.

At 906, the process 900 may include receiving, as an output from the ML model, a score associated with a detached garage at the address. The score 118 may be associated with a confidence that the detached garage was detected within the image data. In some instances, individual scores 118 may be determined by accessing data associated with the property, such as the image data 100, providing the data as input to the ML model(s) 114, and generating, as output from the ML model(s) 114, the score 118 that is associated with the property containing a detached garage. The score 118 may relate to a probability or likelihood that the property includes a detached garage or does not include a detached garage. In other words, the scores 118 determined by the scoring component 120 (e.g., output by the ML model(s) 114) may be machine learning scores.

At 908, the process 900 may include determining whether the score is greater than a threshold. For example, the score 118 may be compared against a threshold. When the score 118 is greater than the threshold, a high confidence exists that the detached garage was identified, and subsequently, the detached garage may be used as the delivery location for the package and the courier may be routed accordingly. Alternatively, when the score 118 output by the ML model(s) 114 is less than the threshold, a low confidence exists that the detached garage was identified. If at 908 the process 900 determines that the score is greater than the threshold, the process 900 may follow the "YES" route and proceed to 910.

At 910, the process 900 may include determining a first delivery route for delivering the package to the detached garage. For example, based at least in part on identifying the detached garage, the package may be delivered to the detached garage. In some instances, the location of the detached garage in the image data 100 (e.g., via bounding boxes, labels, features, etc.) may be used to determine the location of the detached garage, and subsequently, the first delivery route for delivering the package to the detached garage. Adjacent streets, alleyways, etc. may be used as part of determining the first delivery route.

At 912, the process 900 may include receiving first data associated with a delivery of the package to the detached garage. In some instances, the first data may indicate whether the detached garage was located or could not be located, whether the package was delivered to the detached garage, a location taken by the courier personnel 124 to deliver the package, etc. This data may be used as feedback for retraining the ML model(s) 114, and/or updating the profile(s) 108 as to the location of the detached garage. For example, if the courier personnel 124 was instructed to deliver the package to a location of the detached garage, but could not locate the detached garage at the location, such indication may be used to retrain the ML model(s) 114. In such instances, the courier may identify the correct location of the detached garage and deliver the package. Moreover, a location of the courier personnel 124 may be recorded to know the route taken to deliver the package.

Returning to 908, if the process 900 determines that the score 118 is not greater than the threshold, the process 900 may follow the "NO" route and proceed to 914. At 914, the process 900 may include determining a second delivery route for delivering the package to the address. For example, if the detached garage was unable to be identified, or a confidence in the detached garage being identified was less than a threshold, the package may be delivered to another location, such as a front porch, steps, etc. of the house.

At 916, the process 900 may include receiving second data associated with delivery of the package to the address. For example, as part of the delivering the package to the front porch of the house, the courier personnel 124 may provide feedback as to the delivery. The feedback may indicate a location of where the courier personnel 124 delivered the package, a route taken by the courier personnel 124, whether the courier personnel 124 was able to locate the detached garage, whether the property include the detached garage, etc. For example, even though the detached garage was unable to be identified, the courier personnel 124 may utilize their own knowledge to locate the detached garage upon arriving at the address. As another example, the courier personnel 124 may be instructed to attempt to locate the detached garage upon arriving at the address.

At 918, the process 900 may include determining whether the detached garage was located. For example, the second data may indicate whether the detached garage was located, or whether the courier personnel 124 delivered the package to the detached garage. If at 918 the process 900 determines that the detached garage was located, the process 900 may follow the "YES" route and proceed to 920. At 920, the process 900 may include updating a profile associated with the address. For example, when the detached garage was identified, the location of the detached garage may be used in future deliveries to the address. Alternatively, if at 918 the detached garage was not located, the process 900 may follow the "NO" route and proceed to 922. At 922, the process 900 may include outputting an indication to a consumer associated with the address. For example, when the detached garage was unable to be identified by the ML model(s) 114 and/or the courier personnel 124, the consumer 104 may be asked to locate the detached garage from image data of the their property. From 922, the process 900 may proceed to 924 to update the profile(s) 108.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

determining an address associated with a delivery of a package to an address, determining, based at least in part on the address, first image data associated with the address, obtaining, based on coordinates associated with the address, a plurality of tiles representing satellite imagery, wherein each tile of the plurality of tiles is associated with respective tile coordinates indicating boundaries of the tile;

stitching together the plurality of tiles to generate combined image data representing an entirety of a property associated with the address;

determining boundary coordinates associated with property lines of the property;

generating, based at least in part on comparing the boundary coordinates against the tile coordinates of the plurality of tiles, second image data by cropping the combined image data to the property lines, wherein cropping the combined image data to the property lines avoids identifying a neighboring detached garage, providing, as an input to a trained machine learning model, the second image data, generating, as an output from the trained machine learning model, a score associated with the address, the score indicating a probability that the address includes a detached garage, and sending, via one or more wired or wireless communications network and based at least in part on a comparison of the score to a threshold, first location data associated with the address and data indicative of a request to confirm or change the possible location of the detached garage to a mobile device of a user;

receiving, over the one or more wired or wireless communication network and responsive to the data indicative of the request to confirm or change the possible location of the detached garage, user input indicative of second location data associated with the detachable garage located at the address;

storing fourth location data, based on the third location data, identifying a location of the detachable garage; and sending, over the one or more wired or wireless communication network, the fourth location data associated with the detached garage to a device of a third party.

2. The method of claim 1, further comprising determining that the score does not satisfy a threshold, and wherein determining that the address includes the detached garage is based at least in part on the user input.

3. The method of claim 1, wherein generating the score is based at least in part on at least one of:

determining a first location of a house at the address;

determining a second location of the detached garage at the address;

determining a third location of a road adjacent to the address; or determining a fourth location of a vehicle at the address.

4. A method comprising:

determining a first address associated with an account of a first user;

accessing first image data representing satellite imagery;

obtaining, based on coordinates associated with the first address, a plurality of tiles from the first image data, wherein each tile of the plurality of tiles is associated with respective tile coordinates indicating boundaries of the tile;

stitching together the plurality of tiles to generate combined image data representing an entirety of a property associated with the first address;

determining boundary coordinates associated with property lines of the property;

generating, based at least in part on comparing the boundary coordinates against the tile coordinates of the plurality of tiles, second image data by cropping the combined image data to the property lines, wherein cropping the combined image data to the property lines avoids identifying a neighboring detached garage;

determining, using a machine learning model and the second image data:

first location data indicating a possible location of a detached garage, and a confidence value indicating a confidence level associated with the possible location of the detached garage;

sending, via one or more wired or wireless communications network and based on comparing the confidence value to a threshold, second location data and data indicative of a request to confirm or change the possible location of the detached garage to a device of the first user;

receiving, over the one or more wired or wireless communication network and responsive to the data indicative of the request to confirm or change the possible location of the detached garage, user input indicative of third location data associated with the detachable garage;

storing fourth location data, based on the third location data, identifying a location of the detachable garage; and sending, over the one or more wired or wireless communication network, the fourth location data associated with the detachable garage to a device of a third party.

5. The method of claim 4, wherein the third location data and the fourth location data are the same location data.

6. The method of claim 4, wherein the first location data comprises latitude and longitude coordinates, and the fourth location data comprises an address.

7. The method of claim 4, wherein the first location data comprises geocoordinates.

8. The method of claim 4, wherein the machine learning model comprises a convolutional neural network.

9. The method of claim 4, wherein the machine learning model comprises a visual transformer.

10. The method of claim 4, wherein the first location data is determined using a plurality of machine learning models.

11. A method comprising:

determining a first address associated with an account of a first user;

accessing first image data representing satellite imagery;

obtaining, based on coordinates associated with the first address, a plurality of tiles from the first image data, wherein each tile of the plurality of tiles is associated with respective tile coordinates indicating boundaries of the tile;

stitching together the plurality of tiles to generate combined image data representing an entirety of a property associated with the first address;

determining boundary coordinates associated with property lines of the property;

generating, based at least in part on comparing the boundary coordinates against the tile coordinates of the plurality of tiles, second image data by cropping the combined image data to the property lines, wherein cropping the combined image data to the property lines avoids identifying a neighboring detached garage;

determining, using a machine learning model and the second image data:

location data indicating a possible location of a detached garage, and a confidence value indicating a confidence level associated with identification of the detached garage;

sending, via one or more wired or wireless communications network and based on comparing the confidence value to a threshold, sending second location data and data indicative of a request to confirm or change the possible location of the detached garage to a device of the first user;

receiving, over the one or more wired or wireless communication network and responsive to the data indicative of the request to confirm or change the possible location of the detached garage, user input indicative of third location data associated with the detachable garage;

storing fourth location data, based on the third location data, identifying a location of the detachable garage; and sending, over the one or more wired or wireless communication network, the fourth location data associated with the detachable garage to a mobile device of a third party.

12. The method of claim 11, wherein the user input confirms that a detached garage is located at the possible location.

13. The method of claim 11, further comprising receiving, at a first system, confirmation data indicating that the first user has confirmed that the detached garage is located at the possible location.

14. The method of claim 11, further comprising receiving confirmation data indicating that the first user has confirmed that the detached garage is located at the possible location.

15. The method of claim 11, wherein the location data comprises latitude and longitude coordinates.

16. The method of claim 11, wherein the location data comprises an address.

17. The method of claim 11, wherein the location data comprises geocoordinates.

18. The method of claim 11, wherein the machine learning model comprises a convolutional neural network.

19. The method of claim 11, wherein the machine learning model comprises a visual transformer.

* * * * *